US012748033B2

(12) United States Patent
Halpert et al.

(10) Patent No.: US 12,748,033 B2
(45) Date of Patent: Sep. 29, 2026

(54) METHODS FOR GROUP-WISE CYTOMETRY DATA ANALYSIS AND SYSTEMS FOR SAME

(71) Applicant: Becton, Dickinson and Company, Franklin Lakes, NJ (US)

(72) Inventors: Richard Halpert, Ashland, OR (US); John Quinn, Yardley, PA (US); Michael Golden, Medford, OR (US); Matthew Swindle, Grants Pass, OR (US); Clayton Ross Simons, Medford, OR (US); Leslie Wilson, Ashland, OR (US)

(73) Assignee: Augusta SpinCo Corporation, Milford, MA (US)

( * ) Notice: Subject to any disclaimer, the term of this patent is extended or adjusted under 35 U.S.C. 154(b) by 763 days.

(21) Appl. No.: 18/106,280

(22) Filed: Feb. 6, 2023

(65) Prior Publication Data

US 2023/0304915 A1 Sep. 28, 2023

Related U.S. Application Data

(60) Provisional application No. 63/309,956, filed on Feb. 14, 2022.

(51) Int. Cl.
*G01N 15/1429* (2024.01)
*G01N 15/14* (2024.01)
(Continued)

(52) U.S. Cl.
CPC ....... *G01N 15/1429* (2013.01); *G06F 3/0482* (2013.01); *G06F 3/0486* (2013.01); *G01N 2015/1402* (2013.01)

(58) Field of Classification Search
CPC ........... G01N 15/1429; G01N 15/1459; G01N 2015/1006; G01N 2015/1402;
(Continued)

(56) References Cited

U.S. PATENT DOCUMENTS

| | | | |
|---|---|---|---|
| 2008/0215297 | A1 | 9/2008 | Goebel et al. |
| 2011/0204259 | A1 | 8/2011 | Rogers et al. |

(Continued)

FOREIGN PATENT DOCUMENTS

| | | | |
|---|---|---|---|
| CA | 107850526 | A | 3/2018 |

OTHER PUBLICATIONS

Den Braanker, et al., "How to Prepare Spectral Flow Cytometry Datasets for High Dimensional Data Analysis: A Practical Workflow", Frontiers in Immunology, Nov. 19, 2021, vol. 12, Article 768113, pp. 1-12.

*Primary Examiner* — An H Do
(74) *Attorney, Agent, or Firm* — Khin K. Chin; Bret E. Field; Bozicevic, Field & Francis LLP

(57) ABSTRACT

Aspects of the present disclosure include methods for processing cytometer data, such as for group-wise analysis of the cytometer data (e.g., flow cytometry data in FCS format, mass cytometry data, genomic cytometry data). Methods according to certain embodiments include generating a compound population of events that include data accessors from cytometry data, such as where the compound population of cytometer data is from two or more different samples retained as separate raw data files (e.g., are not concatenated to form a single combined data file). Systems having an input module for receiving cytometer data and processor with memory having instructions for practicing the subject methods are also described. Non-transitory computer readable storage medium is also provided.

19 Claims, 9 Drawing Sheets

(51) Int. Cl.
*G06F 3/0482* (2013.01)
*G06F 3/0486* (2013.01)

(58) Field of Classification Search
CPC ... G01N 15/149; G06F 3/0482; G06F 3/0486; G16B 40/00; G16B 45/00
See application file for complete search history.

(56) References Cited

U.S. PATENT DOCUMENTS

| | | | | |
|---|---|---|---|---|
| 2016/0025621 | A1 | 1/2016 | Kapinsky | |
| 2019/0331587 | A1 | 10/2019 | Roberts | |
| 2020/0225141 | A1* | 7/2020 | Trotter | G01N 15/1459 |
| 2021/0239592 | A1 | 8/2021 | Halpert | |

* cited by examiner

METHODS FOR GROUP-WISE CYTOMETRY DATA ANALYSIS AND SYSTEMS FOR SAME

CROSS-REFERENCE TO RELATED APPLICATIONS

Pursuant to 35 U.S.C. § 119 (e), this application claims priority to the filing date of U.S. Provisional Patent Application Ser. No. 63/309,956 filed Feb. 14, 2022; the disclosure of which application is incorporated herein by reference in its entirety.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector.

One technique that utilizes light detection to characterize the components in a sample is flow cytometry. A flow cytometer includes a photo-detection system made up of the optics, photodetectors and electronics that enable efficient detection of optical signals and its conversion to corresponding electric signals. The electronic signals are processed to obtain parameters that a user can utilize to perform desired analysis. Cytometers further include means for recording and analyzing the measured data. For example, data storage and analysis may be carried out using a computer connected to the detection electronics. The data can be stored in tabular form, where each row corresponds to data for one particle, and the columns correspond to each of the measured parameters. The use of standard file formats, such as an "FCS" file format, for storing data from a particle analyzer facilitates analyzing data using separate programs and/or machines. Using current analysis methods, the data typically are displayed in 1-dimensional histograms or 2-dimensional (2D) plots for ease of visualization.

The data obtained from an analysis of particles (e.g., cells) by flow cytometry are often multidimensional, where each particle corresponds to a point in a multidimensional space defined by the parameters measured. Populations of particles or cells can be identified as clusters of points in the data space. For example, identifying populations of interest can be carried out by drawing a gate around a population displayed in one or more 2-dimensional plots, referred to as "scatter plots" or "dot plots," of the data.

SUMMARY

Aspects of the present disclosure include methods for processing cytometer data, such as for group-wise analysis of the cytometer data (e.g., flow cytometry data in FCS format, mass cytometry data, genomic cytometry data). Methods according to certain embodiments include generating a compound population of events that include data accessors from cytometry data, such as where the compound population of cytometer data is from two or more different samples retained as separate raw data files (e.g., are not concatenated to form a single combined data file). Systems having an input module for receiving cytometer data and processor with memory having instructions for practicing the subject methods are also described. Non-transitory computer readable storage medium is also provided.

In practicing the subject methods, a compound population of events that include data accessors is generated from cytometry data collected from one or more samples having particles, such as where the particles are irradiated by a light source in a flow stream. In some embodiments, the cytometry data is generated based on detecting one or more of light absorption, light scatter, light emission (e.g., fluorescence) from the sample. In some instances, the compound population is generated from cytometry data from two or more different samples, such as three or more different samples, such as four or more different samples, such as five or more different samples and including generating a compound population from cytometry data collected from ten or more different samples. In certain embodiments, the compound population is generated from cytometry data from a single sample. In some embodiments, the compound population includes data accessors for each event of the cytometry data. In some embodiments, the data accessors are configured to access metadata for each event of the cytometry data, such as accessing the metadata associated with the raw data files collected for each sample. In some embodiments, the data accessors include source identity for each event of the samples. In some instances, the compound population is generated from cytometry data from two or more different samples where the raw data (i.e., data acquired from the light detection system without any type of post-acquisition processing) from each sample is retained as separate data files. For example, the compound population is generated from cytometry data from two or more different samples where the raw data files from each sample are not concatenated to form a single combined data file.

In some embodiments, methods include applying a data gate to the compound population to generate a gated compound population. In some embodiments, methods include applying a hierarchy of data gates to the compound population. In some instances, applying a hierarchy of data gates to the compound population is sufficient to generate a hierarchy of gated compound populations. In some instances, applying the data gate to the compound population is sufficient to apply the data gate to a plurality of events in the compound population. In certain instances, applying the data gate to the compound population provides for applying the data gate to every event in the compound population. In some embodiments, methods include defining one or more subpopulation of events of the compound population where application of a data gate is sufficient to apply the data gate to all of the events of the subpopulation. In some embodiments, an analysis algorithm is applied to the gated compound population, such as applying a clustering algorithm or a compensation matrix to the gated compound population.

In certain embodiments, a data gate is desynchronized for one or more samples of the gated compound population. In some instances, desynchronizing a data gate includes changing the geometry of a data gate applied to one or more samples of the gated compound population. In certain instances, methods include desynchronizing a data gate (e.g., changing gate geometry) for a plurality of samples, such as where data gates are desynchronized sequentially (i.e., one at a time) for each sample of the compound population.

In some embodiments, the compound population of events is displayed on a graphical user interface. In some instances, the graphical user interface includes a first pane configured to display one or more ungated compound populations that includes cytometry data of one or more groups of samples, a second pane configured to display one or more gated compound populations; and a third pane configured to display data files for each of the samples used to generate the compound populations. In some instances, the gated compound populations of the second pane are displayed as a hierarchy. In some instances, the second pane is configured to display analysis algorithms applied to the events of the compound population that is selected in the first pane, such as clustering algorithms or compensation matrices applied to compound populations displayed in the first pane. In some embodiments, the hierarchy of gated compound populations are color-coded in the second pane. In one example, each of the inherited data gates are labeled in the same color. In some instances, desynchronized data gates are visualized in the second pane. In some instances, each desynchronized data gate is visualized in the second pane by a distinct text font. In some embodiments, the third pane of the graphical user interface is configured to display data files for each sample having events within a gated compound population that is selected in the second pane.

In some embodiments, methods include applying an analysis algorithm that is displayed in the first pane to one or more of the gated compound populations displayed in the second pane. In certain instances, applying an analysis algorithm to one or more gated compound populations includes dragging the analysis algorithm displayed in the first pane onto the gated compound population displayed in the second pane. In other instances, applying an analysis algorithm to one or more gated compound populations includes selecting an analysis algorithm from a menu of analysis algorithms and applying the selected algorithm to the gated compound population displayed in the second pane. In certain instances, an icon is displayed in the second pane on the gated compound population in response to applying the analysis algorithm from the first pane. In some embodiments, applying the analysis algorithm to the gated compound population in the second pane is sufficient to apply the analysis algorithm to one or more gated compound populations in the hierarchy of gated compound populations. In some instances, applying the analysis algorithm to the gated compound population is sufficient to apply the analysis algorithm to all of the gated compound populations in the hierarchy of gated compound populations.

In some embodiments, methods include applying an analysis algorithm displayed in the first pane to one or more of the data files for the samples displayed in the third pane. In certain instances, applying the analysis algorithm includes dragging an analysis algorithm displayed in the first pane onto a data file for a sample displayed in the third pane. In other instances, applying an analysis algorithm to one or more of the data files for the samples displayed in the third pane includes selecting an analysis algorithm from a menu of analysis algorithms and applying the selected algorithm to one or more of the data files for the samples displayed in the third pane. In some embodiments, methods include applying an analysis algorithm displayed in the second pane (e.g., tSNE, x-shift algorithm) to one or more of the data files for the samples displayed in the third pane. In certain instances, applying the analysis algorithm includes dragging an analysis algorithm displayed in the second pane onto a data file for a sample displayed in the third pane.

Aspects of the present disclosure also include systems for processing flow cytometer data. Systems according to certain embodiments include an input module configured to receive flow cytometer data from one or more samples having particles irradiated by a light source in a flow stream and a processor having memory operably coupled to the processor where the memory includes instructions stored thereon which when executed by the processor cause the processor to generate a compound population of events having data accessors from the flow cytometry data. In some instances, systems include a light detection system configured to detect light from particles of a sample in a flow stream irradiated with a light source (e.g., a laser). In some embodiments, light detection systems may include light scatter photodetectors, fluorescence light photodetectors and light loss photodetectors. In some instances, the flow cytometer data is generated based on data signals from scattered light detector channels (e.g., forward scatter image data, side scatter image data). In other instances, the flow cytometer data is generated based on data signals from one or more fluorescence detector channels. In other instances, the flow cytometer data is generated based on data signals from one or more light loss detector channels. In still other instances, the flow cytometer data is generated based on data signals from a combination of data signals from two or more of light scatter detector channels, fluorescence detector channels and light loss detector channels. In certain embodiments, the subject systems are flow cytometers configured to visualize and sort one or more particles in the flow stream.

In some instances, the memory includes instructions stored thereon for generating a compound population from flow cytometry data from two or more different samples, such as three or more different samples, such as four or more different samples, such as five or more different samples and including instructions for generating a compound population from flow cytometry data collected from ten or more different samples. In some embodiments, the memory includes instructions for generating a compound population that includes data accessors for each event of the flow cytometry data. In some embodiments, memory includes instructions for accessing metadata for each event of the flow cytometry data using the data accessors, such as accessing the metadata associated with the raw data files collected for each sample. In some embodiments, the data accessors include source identity for each event of the samples. In some instances, the memory includes instructions for generating a compound population from flow cytometry data from two or more different samples where the raw data from each sample is retained as separate data files. In certain instances, the memory includes instructions for generating the compound population from flow cytometry data from two or more different samples where the raw data files from each sample are not concatenated to form a single combined data file.

In some embodiments, the memory includes instructions stored thereon for applying a data gate to the compound population to generate a gated compound population. In some instances, the memory includes instructions for applying a hierarchy of data gates to the compound population. In some instances, the memory includes instructions for applying a hierarchy of data gates to the compound population to generate a hierarchy of gated compound populations. In some instances, the memory includes instructions for applying the data gate to one event of the compound population, where in certain instances applies the data gate to a plurality of events in the compound population. In certain instances, applying the data gate to a single event of the compound population provides for applying the data gate to every event in the compound population. In some embodiments, the memory includes instructions for defining one or more subpopulation of events of the compound population where application of a data gate is sufficient to apply the data gate all of the events of the subpopulation. In some embodiments, the memory includes instructions for applying an analysis algorithm to the gated compound population, such as instructions for applying a clustering algorithm or a compensation matrix to the gated compound population.

In certain embodiments, the memory includes instructions for desynchronizing a data gate for one or more samples of the gated compound population. In some instances, the memory includes instructions for desynchronizing a data gate by changing the geometry of a data gate applied to one or more samples of the gated compound population. In certain instances, the memory includes instructions for desynchronizing a data gate (e.g., changing gate geometry) for a plurality of samples, such as where data gates are desynchronized sequentially (i.e., one at a time) for each sample of the compound population.

In some embodiments, systems include a display configured to display the compound population of events on a graphical user interface. In some instances, systems include memory having instructions stored thereon which when executed by the processor cause the processor to generate a graphical user interface that includes a first pane configured that displays one or more ungated compound populations that includes cytometry data of one or more groups of samples, a second pane that displays one or more gated compound populations; and a third pane that displays data files for each of the samples used to generate the compound populations. In some instances, the memory includes instructions for generating a graphical user interface where the second pane displays a hierarchy of gated compound populations. In some instances, the second pane displays analysis algorithms applied to the events of the compound population that is selected in the first pane, such as clustering algorithms or compensation matrices applied to compound populations displayed in the first pane. In some embodiments, the hierarchy of gated compound populations are color-coded in the second pane. In some examples, each of the inherited data gates are labeled in the same color. In some instances, the memory includes instructions for generating a graphical user interface which visualizes desynchronized data gates in the second pane. In some instances, each desynchronized data gate is visualized in the second pane by a distinct text font. In some embodiments, the memory includes instructions for displaying in the third pane of the graphical user interface data files for each sample having events within a gated compound population that is selected in the second pane.

In some embodiments, the memory includes instructions for applying an analysis algorithm that is displayed in the first pane to one or more of the gated compound populations displayed in the second pane. In certain instances, the memory includes instructions for applying an analysis algorithm to one or more gated compound populations by dragging the analysis algorithm displayed in the first pane onto the gated compound population displayed in the second pane. In other instances, the memory includes instructions for applying an analysis algorithm to one or more gated compound populations by selecting an analysis algorithm from a menu of analysis algorithms and applying the selected algorithm to the gated compound population displayed in the second pane. In certain instances, the memory includes instructions for displaying an icon in the second pane of the graphical user interface on the gated compound population in response to applying the analysis algorithm from the first pane. In some embodiments, the memory includes instructions for applying the analysis algorithm to the gated compound population in the second pane such that the analysis algorithm is applied to one or more sub-groups in the hierarchy of applied data gates. In some instances, applying the analysis algorithm to the gated compound population is sufficient to apply the analysis algorithm to all of the gated compound populations in the hierarchy of applied data gates.

In some embodiments, the memory include instructions for applying an analysis algorithm displayed in the first pane to one or more of the data files for the samples displayed in the third pane. In certain instances, the memory includes instructions for applying the analysis algorithm by dragging an analysis algorithm displayed in the first pane onto a data file for a sample displayed in the third pane. In other instances, the memory includes instructions for applying an analysis algorithm to one or more of the data files for the samples displayed in the third pane by selecting an analysis algorithm from a menu of analysis algorithms and applying the selected algorithm to one or more of the data files for the samples displayed in the third pane. In some embodiments, the memory include instructions for applying an analysis algorithm displayed in the second pane (e.g., tSNE, x-shift algorithm) to one or more of the data files for the samples displayed in the third pane. In certain instances, the memory include instructions for applying the analysis algorithm by dragging an analysis algorithm displayed in the second pane onto a data file for a sample displayed in the third pane.

Aspects of the present disclosure also include non-transitory computer readable storage medium for processing cytometer data (e.g., flow cytometry data in FCS format, mass cytometry data, genomic cytometry data). Non-transitory computer readable storage medium according to certain embodiments includes instructions having algorithm for generating a compound population of events that include data accessors from the cytometry data. In some instances, the non-transitory computer readable storage medium includes algorithm for processing cytometer data generated based on data signals from scattered light detector channels (e.g., forward scatter image data, side scatter image data). In other instances, the non-transitory computer readable storage medium includes algorithm for processing cytometer data generated based on data signals from one or more fluorescence detector channels. In other instances, the non-transitory computer readable storage medium includes algorithm for processing cytometer data generated based on data signals from one or more light loss detector channels. In still other instances, the non-transitory computer readable storage medium includes algorithm for processing cytometer data generated based on data signals from a combination of data signals from two or more of light scatter detector channels, fluorescence detector channels and light loss detector channels.

In some instances, the non-transitory computer readable storage medium includes algorithm for generating a compound population from cytometry data from two or more different samples, such as three or more different samples, such as four or more different samples, such as five or more different samples and including instructions for generating a compound population from cytometry data collected from ten or more different samples. In some embodiments, the non-transitory computer readable storage medium includes algorithm for generating a compound population that includes data accessors for each event of the cytometry data. In some embodiments, the non-transitory computer readable storage medium includes algorithm for accessing metadata for each event of the cytometry data using the data accessors, such as accessing the metadata associated with the raw data files collected for each sample. In some embodiments, the data accessors include source identity for each event of the samples. In some instances, the non-transitory computer readable storage medium includes algorithm for generating a compound population from cytometry data from two or more different samples where the raw data from each sample is retained as separate data files. In certain instances, the non-transitory computer readable storage medium includes algorithm for generating the compound population from cytometry data from two or more different samples where the raw data files from each sample are not concatenated to form a single combined data file.

In some embodiments, the non-transitory computer readable storage medium includes algorithm for applying a data gate to the compound population to generate a gated compound population. In some instances, the non-transitory computer readable storage medium includes algorithm for applying a hierarchy of data gates to the compound population. In some instances, the non-transitory computer readable storage medium includes algorithm for applying a hierarchy of data gates to the compound population to generate a hierarchy of gated compound populations. In some instances, the non-transitory computer readable storage medium includes algorithm for applying the data gate to one event of the compound population, where in certain instances applies the data gate to a plurality of events in the compound population. In certain instances, applying the data gate to a single event of the compound population provides for applying the data gate to every event in the compound population. In some embodiments, the non-transitory computer readable storage medium includes algorithm for defining one or more subpopulation of events of the compound population where application of a data gate is sufficient to apply the data gate all of the events of the subpopulation. In some embodiments, the non-transitory computer readable storage medium includes algorithm for applying an analysis algorithm to the gated compound population, such as instructions for applying a clustering algorithm or a compensation matrix to the gated compound population.

In certain embodiments, the non-transitory computer readable storage medium includes algorithm for desynchronizing a data gate for one or more samples of the gated compound population. In some instances, the non-transitory computer readable storage medium includes algorithm for desynchronizing a data gate by changing the geometry of a data gate applied to one or more samples of the gated compound population. In certain instances, the non-transitory computer readable storage medium includes algorithm for desynchronizing a data gate (e.g., changing gate geometry) for a plurality of samples, such as where data gates are desynchronized sequentially (i.e., one at a time) for each sample of the compound population.

In some embodiments, the non-transitory computer readable storage medium includes algorithm for generating a graphical user interface that includes a first pane configured that displays one or more ungated compound populations that includes cytometry data of one or more groups of samples, a second pane that displays one or more gated compound populations; and a third pane that displays data files for each of the samples used to generate the compound populations. In some instances, the non-transitory computer readable storage medium includes algorithm for generating a graphical user interface where the second pane displays a hierarchy of gated compound populations. In some instances, the second pane displays analysis algorithms applied to the events of the compound population that is selected in the first pane, such as clustering algorithms or compensation matrices applied to compound populations displayed in the first pane. In some embodiments, the hierarchy of gated compound populations are color-coded in the second pane. In some examples, each of the inherited data gates are labeled in the same color. In some instances, the non-transitory computer readable storage medium includes algorithm for generating a graphical user interface which visualizes desynchronized data gates in the second pane. In some instances, each desynchronized data gate is visualized in the second pane by a distinct text font. In some embodiments, the non-transitory computer readable storage medium includes algorithm for displaying in the third pane of the graphical user interface data files for each sample having events within a gated compound population that is selected in the second pane.

In some embodiments, the non-transitory computer readable storage medium includes algorithm for applying an analysis algorithm that is displayed in the first pane to one or more of the gated compound populations displayed in the second pane. In certain instances, the non-transitory computer readable storage medium includes algorithm for applying an analysis algorithm to one or more gated compound populations by dragging the analysis algorithm displayed in the first pane onto the gated compound population displayed in the second pane. In other instances, the non-transitory computer readable storage medium includes algorithm for applying an analysis algorithm to one or more gated compound populations by selecting an analysis algorithm from a menu of analysis algorithms and applying the selected algorithm to the gated compound population displayed in the second pane. In certain instances, the non-transitory computer readable storage medium includes algorithm for displaying an icon in the second pane of the graphical user interface on the gated compound population in response to applying the analysis algorithm from the first pane. In some embodiments, the non-transitory computer readable storage medium includes algorithm for applying the analysis algorithm to the gated compound population in the second pane such that the analysis algorithm is applied to one or more sub-groups in the hierarchy of applied data gates. In some instances, applying the analysis algorithm to the gated compound population is sufficient to apply the analysis algorithm to all of the gated compound populations in the hierarchy of applied data gates.

In some embodiments, the non-transitory computer readable storage medium includes algorithm for applying an analysis algorithm displayed in the first pane to one or more of the data files for the samples displayed in the third pane. In certain instances, the non-transitory computer readable storage medium includes algorithm for applying the analysis algorithm by dragging an analysis algorithm displayed in the first pane onto a data file for a sample displayed in the third pane. In other instances, the non-transitory computer readable storage medium includes algorithm for applying an analysis algorithm to one or more of the data files for the samples displayed in the third pane by selecting an analysis algorithm from a menu of analysis algorithms and applying the selected algorithm to one or more of the data files for the samples displayed in the third pane. In some embodiments, the non-transitory computer readable storage medium includes algorithm for applying an analysis algorithm displayed in the second pane (e.g., tSNE, x-shift algorithm) to one or more of the data files for the samples displayed in the third pane. In certain instances, the non-transitory computer readable storage medium includes algorithm for applying the analysis algorithm by dragging an analysis algorithm displayed in the second pane onto a data file for a sample displayed in the third pane.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
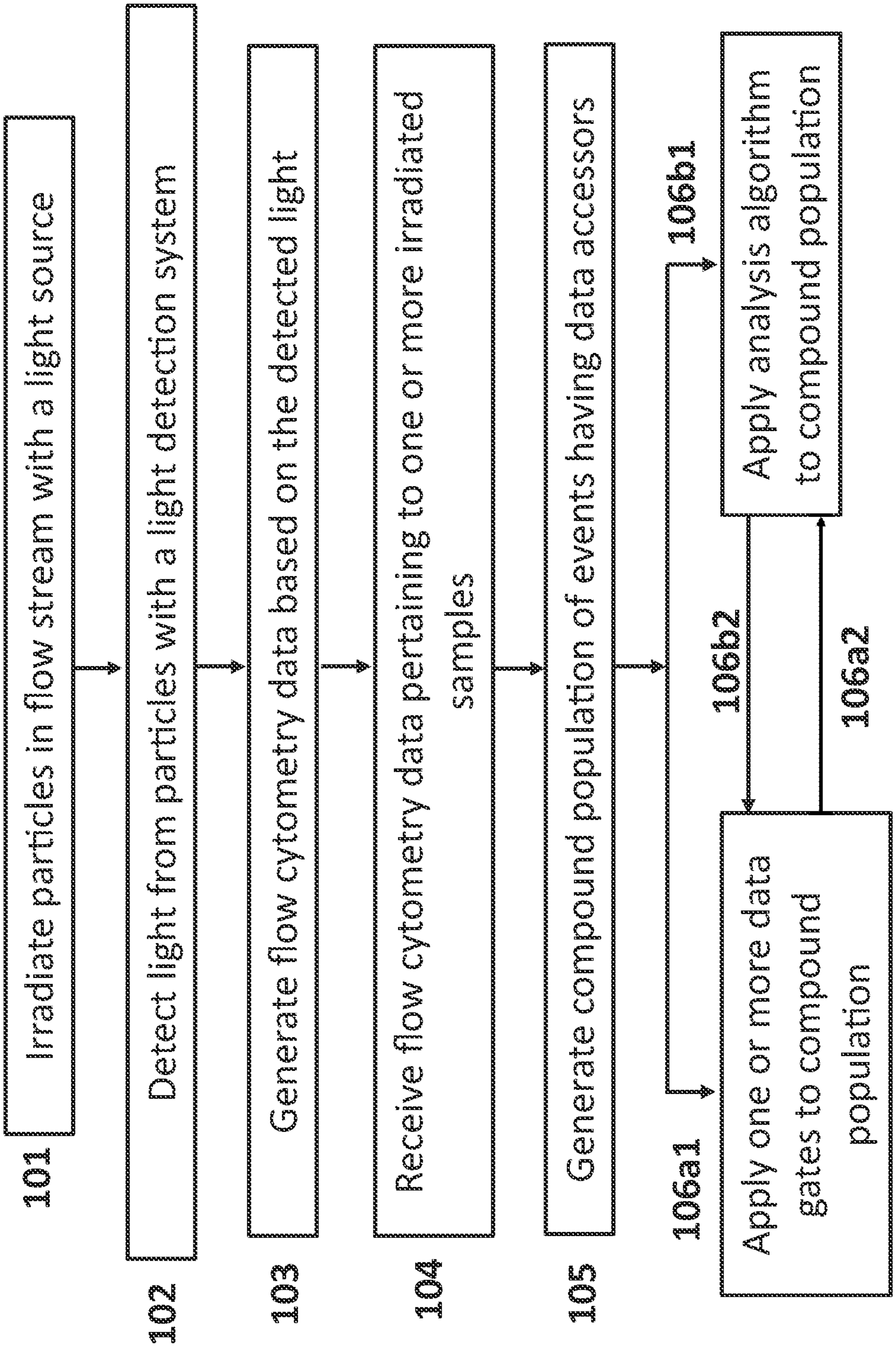
FIG. 1 depicts a flow chart for group-wise analysis of flow cytometry data from one or more samples according to certain embodiments.

Aspects of the present disclosure include methods for processing cytometer data, such as for group-wise analysis of the cytometer data (e.g., flow cytometry data in FCS format, mass cytometry data, genomic cytometry data). Methods according to certain embodiments include generating a compound population of events that include data accessors from flow cytometry data, such as where the compound population of flow cytometer data is from two or more different samples retained as separate raw data files (e.g., are not concatenated to form a single combined data file). Systems having an input module for receiving cytometer data and processor with memory having instructions for practicing the subject methods are also described. Non-transitory computer readable storage medium is also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for processing flow cytometer data, such as for group-wise analysis of the flow cytometer data. In further describing embodiments of the disclosure, methods for generating a compound population of events that include data accessors from the flow cytometry data as well as applying one or more data gates or analysis algorithms to the compound populations are first described in greater detail. Next, systems that include an input module for receiving flow cytometer data and a processor with memory having instructions for practicing the subject methods are provided. Graphical user interfaces and non-transitory computer readable storage medium are further described.

Methods for Group-Wise Analysis of Flow Cytometer Data

Aspects of the present disclosure include methods for processing cytometry data. In some embodiments, the cytometry data includes data which is provided or represented in flow cytometry standard format (FCS format). In certain embodiments, the cytometry data is selected from one or more of flow cytometry data, mass cytometry data or genomic cytometry (e.g., RNA-seq data). In certain instances, the cytometry data is flow cytometry data. As described in greater detail below, flow cytometry data for practicing the subject methods in some instances is generated by detecting light from a sample having particles in a flow stream irradiated with a light source. In some instances, methods provide for group-wise analysis of the cytometer data such as where samples may be arranged into a hierarchy of groups and data analysis (e.g., applying data gates or an analysis algorithm) may be conducted on events in a multitude of different samples without generating a cytometry data file that combines all of the raw data from the multitude of different samples. As described in greater detail below in certain instances data gates or analysis algorithm may be applied to events from two or more different samples without concatenating the raw cytometry data files of each sample. In some embodiments, the subject methods provide for comparative analysis of a collection of samples based on controlled characteristics while retaining source identity without encoding sample groups together (e.g., by filename, folder structure or staining panel). In some embodiments, group-wise analysis of cytometry data according to the subject methods eliminates the need to apply a data gate to events from each individual sample data set. In embodiments, group-wise analysis of cytometry data as described herein provide for improved management and navigation of sample cytometry data (including metadata associated with the cytometry data). In addition, the methods described herein provide for increased efficiency in creating complex data analyses and calculating results from the data analysis.

In practicing the subject methods, a compound population of events that include data accessors is generated from cytometry data collected from one or more samples having particles irradiated by a light source in a flow stream. By "compound population" is meant a set of events that are grouped together from cytometry data collected from one or more samples. In embodiments, the compound population may be cytometry data collected for 2 events or more, such as 3 or more, such as 5 or more, such as 10 or more, such as 25 or more, such as 50 or more, such as 100 or more, such as 250 or more, such as 500 or more, such as 1000 or more, such as 2500 or more, such as 5000 or more and including where the compound population includes cytometry data that is collected for 10000 events or more. The compound population may include the cytometry data of 1% or more of the events collected for each of the samples, such as 2% or more, such as 3% or more, such as 4% or more, such as 5% or more, such as 10% or more, such as 15% or more, such as 25% or more, such as 50% or more, such as 75% or more, such as 90% or more and including the cytometry data of 99% or more of the events collected for the two or more samples.

As described in greater detail below, the compound population may include events from 1 or more different samples, such as 2 or more, such as 3 or more, such as 4 or more, such as 5 or more, such as 6 or more, such as 7 or more, such as 8 or more, such as 9 or more, such as 10 or more, such as 15 or more, such as 25 or more and including cytometry data that is collected from 50 or more different samples. In some instances, the compound population is a gated compound population generated by applying a data gate (e.g., a gate for lymphocytes or a gate for one or more fluorescent markers) to events from one or more different samples.

The term "data accessor" is used herein in its conventional sense to refer to a data access object that provides an interface with the raw data of cytometry data files collected for one or more samples. In some embodiments, the data accessor is an accessor algorithm having programming for retrieving one or more components of the raw data from the cytometry data files. For example, the data accessor in some instances includes programming for retrieving photodetector data signals collected from a side-scattered light photodetector, a forward-scattered light photodetector, a fluorescence photodetector and a light loss photodetector for each event in a sample. In some instances, the source identity of the data collected for each event is retained with the raw data files and the data accessors include programming for retrieving the photodetector data signals using the source identity. In certain instances, the metadata for each event is retained with the raw data files and the data accessors include programming for retrieving the metadata for each event from the raw data files.

By "cytometer data" it is meant information regarding parameters of events (e.g., cells, particles) that is collected by any number of light detectors (as described in greater detail below) in a particle analyzer. In some embodiments, the flow cytometer data is received from a forward scatter detector. For example, a forward scatter detector may, in some instances, yield information regarding the overall size of a particle. In some embodiments, the cytometer data is received from a side scatter detector. A side scatter detector may, in some instances, be configured to detect refracted and reflected light from the surfaces and internal structures of the particle, which tends to increase with increasing particle complexity of structure. In some embodiments, the cytometer data is received from a fluorescent light detector. A fluorescent light detector may, in some instances, be configured to detect fluorescence emissions from fluorescent molecules, e.g., labeled specific binding members (such as labeled antibodies that specifically bind to markers of interest) associated with the particle in the flow cell. In certain embodiments, methods include detecting fluorescence from the sample with one or more fluorescence detectors, such as 2 or more, such as 3 or more, such as 4 or more, such as 5 or more, such as 6 or more, such as 7 or more, such as 8 or more, such as 9 or more, such as 10 or more, such as 15 or more and including 25 or more fluorescence detectors.

In embodiments, cytometry data of the compound population is retained as separate raw data files collected for each of the samples. In some instances, the raw data files are not concatenated to form a single combined data file. The term "concatenated" is used herein in its conventional sense to refer to flow cytometry data which is processed to generate a combined data file which includes the raw data files collected for two or more different samples. In some instances, concatenated data includes cytometry data where all or a portion of cytometry data collected for two or more samples is combined into a single data file. For example, 1% or more of the cytometry data collected for each of the samples may be combined together to form a single data file, such as 2% or more, such as 3% or more, such as 4% or more, such as 5% or more, such as 10% or more, such as 15% or more, such as 25% or more, such as 50% or more, such as 75% or more, such as 90% or more and including where concatenating data includes combining 99% or more of the cytometry data collected for two or more samples into a single data file. In embodiments, the data of the compound population is not concatenated.

In some embodiments, methods include applying a data gate to the compound population to generate a gated compound population. The term "gate" is used herein in its conventional sense to refer to a classifier boundary identifying a subset of data of interest. In some instances, a gate can bound a group of events of particular interest. In addition, "gating" may refer to the process of classifying the data using a defined gate for a given set of data, where the gate can be one or more regions of interest combined with Boolean logic. In some embodiments, a gate defines a boundary for classifying populations of flow cytometer data from one or more samples. In some embodiments, a gate identifies cytometer data exhibiting the same parameters. Examples of methods for gating have been described in, for example, U.S. Pat. Nos. 4,845,653; 5,627,040; 5,739,000; 5,795,727; 5,962,238; 6,014,904; 6,944,338; and 8,990,047; the disclosures of which are herein incorporated by reference. In some embodiments, the gate bounds a population of cytometer data from one or more different samples that has previously been determined (e.g., by a user), to correspond to properties of interest. The data obtained from an analysis of particles (e.g. cells) by cytometry can be multidimensional, where each particle (e.g., cell) corresponds to a point in a multidimensional space defined by the parameters measured. Populations of cells or particles can be identified as clusters of points in the data space. In some embodiments, methods include generating one or more population clusters from the compound population based on the determined parameters of analytes (e.g., cells, particles) in the sample. As used herein, a "population", or "subpopulation" of analytes, such as cells or other particles, refers to a group of analytes that possess properties (for example, optical, impedance, or temporal properties) with respect to one or more measured parameters such that measured parameter data form a cluster in the data space. In embodiments, data includes signals from a plurality of different parameters, such as, for instance 2 or more, 3 or more, 4 or more, 5 or more, 6 or more, 7 or more, 8 or more, 9 or more, 10 or more, and including 20 or more. Thus, populations are recognized as clusters in the data. Conversely, each data cluster may be interpreted as corresponding to a compound population of a particular type of cell or analyte, although clusters that correspond to noise or background typically also are observed. A cluster may be defined in a subset of the dimensions, e.g., with respect to a subset of the measured parameters, which corresponds to compound populations that differ in only a subset of the measured parameters or features extracted from the measurements of the cell or particle.

In some embodiments, methods include receiving cytometer data, calculating parameters of each analyte, and clustering together analytes based on the calculated parameters. For example, an experiment may include particles labeled by several fluorophores or fluorescently labeled antibodies, and groups of particles may be defined by populations corresponding to one or more fluorescent measurements. In the example, a first group may be defined by a certain range of light scattering for a first fluorophore, and a second group may be defined by a certain range of light scattering for a second fluorophore. If the first and second fluorophores are represented on an x and y axis, respectively, two different color-coded populations might appear to define each group of particles, if the information was to be graphically displayed. Any number of analytes may be assigned to a cluster, including 5 or more analytes, such as 10 or more analytes, such as 50 or more analytes, such as 100 or more analytes, such as 500 analytes and including 1000 analytes. In certain embodiments, the method groups together in a cluster rare events (e.g., rare cells in a sample, such as cancer cells) detected in the sample. In these embodiments, the analyte clusters generated may include 10 or fewer assigned analytes, such as 9 or fewer and including 5 or fewer assigned analytes.

In some embodiments, applying a data gate to a single event of a compound population is sufficient to apply the data gate to a plurality of events of the compound population. For example, a data gate applied to an event of a compound population may be applied to 1% or more of the remaining events of the compound population, such as 2% or more, such as 3% or more, such as 4% or more, such as 5% or more, such as 10% or more, such as 25% or more, such as 50% or more, such as 75% or more, such as 90% or more, such as 95% or more, such as 97% or more and including 99% or more of the events of the compound population. In certain instances, applying a data gate to a single event of a compound population is sufficient to apply the data gate to all of the events (i.e., 100%) of the compound population.

In some embodiments, a hierarchy of data gates are applied to the compound population. In some instances, applying a hierarchy of data gates to the compound population is sufficient to generate a hierarchy of gated compound populations. In some instances, the hierarchy of data gates generates at least one parent gated compound population and at least one descendant gated compound population. In certain instances, two or more hierarchies of data gates are applied to a compound population which generates 2 or more different descendent gated compound populations, such as 3 or more, such as 4 or more, such as 5 or more and including 10 or more.

In one example, a hierarchy of data gates may be applied to generate a compound population from cytometry data collected from a biological sample. In certain instances, a first gated compound population corresponds to events of diseased sample cells and a second gated compound population corresponds to events of normal sample cells. The first gated compound population (composed of event data from diseased sample cells) may include a compound population corresponding to lymphocytes. The lymphocyte compound population includes single cells. The singles cells includes compound populations which correspond to B cells and to T cells. In this example, the first hierarchy of data gates applied to the compound population generates the gated compound population of diseased cells and the gated compound populations corresponding to lymphocytes, single cells, B cells and T cells.

In some embodiments, applying a data gate to a gated compound population is sufficient to apply the data gate to one or more of the other gated compound populations in the hierarchy (i.e., a data gate is inherited). In certain embodiments, data gates applied to the compound population are group-owned data gates. By "group-owned" is meant that data gates applied to a group of events are attributed to the group and not to a sample. In some instances, to maintain the group-wise analysis data gates or analysis algorithm applied to even a single event of a sample are attributed to (and run on) the entire group. In certain instances, the data gate or analysis algorithm is applied to each sample individually of the compound population and attributed back to the gated compound population.

In some instances, an analysis algorithm is applied to the compound population. In one example, a first compound population may include events with an applied spectral compensation algorithm and a second compound population may include events where the spectral compensation algorithm is not applied. In another example, a first compound population may include events with an applied clustering algorithm and a second compound population may include events where the clustering algorithm is not applied. In certain instances, the analysis algorithm is applied to one or more gated compound populations. In some instances, applying the analysis algorithm to a gated compound population is sufficient to apply the analysis algorithm one or more other gated compound populations in a hierarchy of gated compound populations. For example, applying the analysis algorithm to a gated compound population is sufficient to apply the analysis algorithm to descendant gated compound populations in the hierarchy. Any convenient analysis algorithm can be applied to events of the compound population, such as for example a spectral compensation algorithm, a t-distributed stochastic neighbor embedding (tSNE) algorithm, x-shift algorithm or a clustering algorithm. In certain instances, the analysis algorithm is a spectral unmixing algorithm, such as described in U.S. Pat. No. 11,009,400 and International Patent Application No. PCT/US2021/46741 filed on Aug. 19, 2021, the disclosures of which are herein incorporated by reference.

In certain embodiments, a data gate is desynchronized for one or more samples of the gated compound populations. In some instances, desynchronizing a data gate is sufficient to exclude from one or more events from a gated compound population. For example, desynchronizing a data gate for one or more samples of the gated compound population is sufficient to exclude 2 or more events from the gated compound population, such as 5 or more, such as 10 or more, such as 25 or more, such as 50 or more, such as 100 or more and including 250 or more. In some embodiments, desynchronizing a data gate includes changing the geometry of a data gate that is applied to one or more samples of the gated compound population. In certain instances, methods include desynchronizing a data gate (e.g., changing gate geometry) for a plurality of samples, such as where data gates are desynchronized sequentially (i.e., one at a time) for each sample of the compound population.

In certain embodiments, methods include implementing a dynamic algorithm, such as a machine learning algorithm for generating or desynchronizing one or more data gates. In some instances, the geometry of a data gate for one or more samples of a compound population may be determined by the machine learning algorithm. In certain instances, a change in the geometry of a data gate is determined by the machine learning algorithm. For example, in some embodiments the change in the geometry of the data gate may be sufficient to increase the number of events which fall within the gate. In other embodiments the change in the geometry of the data gate is sufficient to decrease the number of events which fall within the gate. The term "machine learning" is used herein in its conventional sense to refer to adjustments to the data gates (e.g., the geometry of the data gates) by computational methods that ascertain and implement information directly from data without relying on a predetermined equation as a model. In certain embodiments, machine learning includes learning algorithms which find patterns in data signals (e.g., from a plurality of particles in the sample). In these embodiments, the learning algorithm is configured to generate better and more accurate decisions and predictions as a function of the number of data signals (i.e., the learning algorithm becomes more robust as the number of characterized particles from the sample increases). Machine-learning protocols of interest may include, but are not limited to artificial neural networks, decision tree learning, decision tree predictive modeling, support vector machines, Bayesian networks, dynamic Bayesian networks, genetic algorithms among other machine learning protocols.

FIG. 1 depicts a flow chart for group-wise analysis of flow cytometry data from one or more samples according to certain embodiments. At step 101, particles in a flow stream are irradiated with a light source and light from the particles is detected at step 102. Flow cytometry data is generated from the photodetector signals at step 103. Flow cytometry data from one or more irradiated samples is received (e.g., by a processor or data server) at step 104. A compound population is generated (step 105) from the flow cytometry data where the events of the compound population have data accessors that are associated with the raw data of the flow cytometry data received at step 104. As described above, the compound population is a virtually concatenated cluster of events taken from the flow cytometry data and a single distinct data file combining the data from different sample populations (i.e., concatenated data) is not generated. In addition, the compound population retains source identity and access to the metadata from the raw data signals of the flow cytometry data, in contrast to concatenated data that is combined into a newly generated flow cytometer data file. One or more data gates (e.g., a hierarchy of data gates with group-wise inheritance of gating) can be applied to the compound population, as shown at step **106*a*1 or may be applied at step 106*a*2 to a compound population which has been applied an analysis algorithm. An analysis algorithm such as a compensation matrix or clustering algorithm may also be applied to the compound population at step 106*b*1 or may be applied at step 106*b*2** to one or more of the sub-groups generated by the applied data gates.

In some embodiments, the compound population is displayed on a graphical user interface. In some instances, the graphical user interface is a three pane graphical user interface, such as where the user interface is optimized for visualizing and applying data gates to compound populations generated from raw data files of two or more different samples. In some instances, the graphical user interface includes a first pane configured to display one or more ungated compound populations that includes cytometry data of one or more groups of samples, a second pane configured to display one or more gated compound populations (e.g., compound populations with applied data gate or analysis algorithm) and a third pane configured to display the data files for each of the samples used to generate the compound populations. In some instances, the second pane is configured to display a hierarchy of gated compound populations selected in the first pane of the graphical user interface. In some instances, the second pane is configured to display analysis algorithms applied to the events of the compound population that is selected in the first pane, such as clustering algorithms or compensation matrices applied to compound populations displayed in the first pane. In some embodiments, the hierarchy of gated compound populations are color-coded in the second pane. In one example, each of the inherited data gates are labeled in the same color. In some instances, desynchronized data gates are visualized in the second pane. In some instances, each desynchronized data gate is visualized in the second pane by a distinct text font. In some embodiments, the third pane of the graphical user interface is configured to display data files for each sample having events within a gated compound population that is selected in the second pane.

Figure 2:
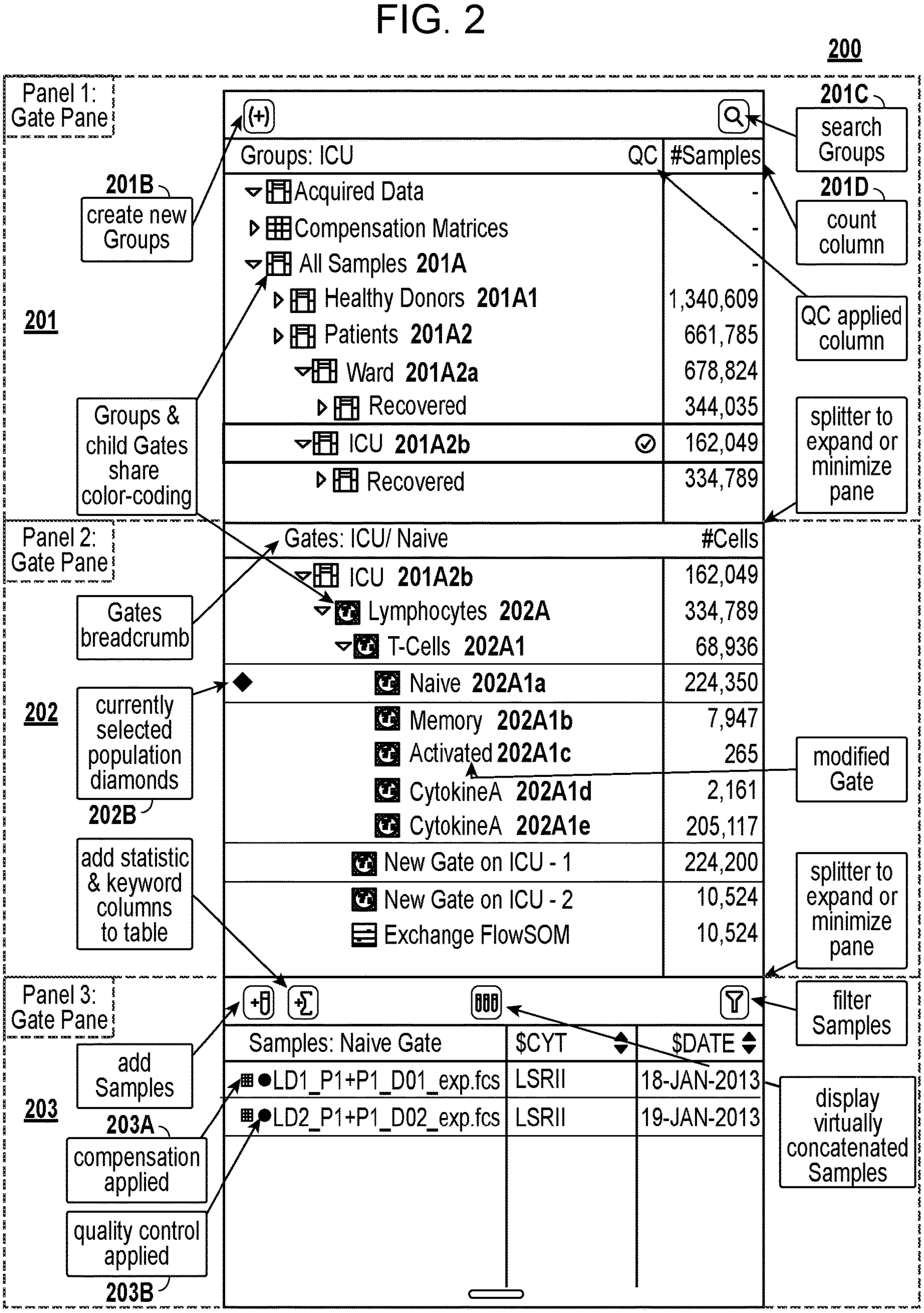
FIG. 2 depicts a graphical user interface for group-wise analysis of flow cytometry data according to certain embodiments.

FIG. 2 depicts a graphical user interface for group-wise analysis of flow cytometry data according to certain embodiments. Graphical user interface 200 includes first pane 201 that depicts compound populations having a hierarchy of distinct sample groups. First pane 201 includes compound population 201A ("All Samples") which includes a hierarchy of distinct sample groups. Compound population 201A includes sub-groups that correspond to events from healthy donors (population 201A1) and to events from patient samples (population 201A2). As shown in FIG. 2, the population 201A2 ("patients") sub-group further includes compound populations of events from samples collected from patients (population 201A2*a*) in the hospital ward ("ward" sub-group) and events from samples collected from patients (population 201A2*b*) in the hospital intensive care unit ("ICU" sub-group). Each of the population 201A2*a* ("ward") and population 201A2*b* ("ICU") sub-groups contains a further subgroup that includes "recovered" patients. The number of events in each of the sub-groups is also depicted in column 201D of first pane 201. First pane 201 of graphical user interface 200 also includes an icon 201B for adding new compound populations as well as an icon 201C for searching the different compound populations shown in first pane 201.

Graphical user interface 200 includes second pane 202 which is configured to display a hierarchy of gated compound populations that can be selected from the groups of samples displayed in the first pane. As shown in FIG. 2, population 201A2*b* (the events from samples of patients in the hospital intensive care unit, "ICU") is selected in first pane 201 and the hierarchy of gated populations 201A2*b* are shown in second pane 202. Gated compound population 201A2*b* has a group-owned hierarchy of applied data gates which generate gated compound population 202A for lymphocytes which further includes a gated compound population 202A1 for T-cells. Gated compound population 202A1 further includes gated population 202A1*a* (naïve T-cells), gated population 202A1*b* (memory T-cells), gated population 202A1*c* (activated T-cells), gated population 202A1*d* (cytokine A) and gated population 202A1*e* (cytokine B). As discussed in detail above, in some embodiments the applied data gates remain group-owned (i.e., remain with the generated compound population) and are depicted by being color-coded in the second pane. As shown in FIG. 2, the hierarchy of data gates retained by compound population 201A2*b* are all shown in the same color indicating that these gates are inherited throughout the groups of samples of each compound population. Here, the gates inherited by the "ICU" group 201A2*b* are from the "All Samples" group 201A. Second pane 202 includes an icon 202B to indicate the compound population selected in the second pane.

Graphical user interface 200 includes third pane 203 which is configured to display the samples where flow cytometry data is accessed (through data accessors) by the compound populations listed in first pane 201 and the data gates shown second pane 202. Third pane 203 includes icons 203A which indicates that an analysis algorithm (spectral compensation matrix) has been applied to the sample data and 203B which indicates that a quality control algorithm has been applied to the sample data.

In some embodiments, methods include applying an analysis algorithm that is displayed in the first pane to one or more of the gated compound populations displayed in the second pane. In certain instances, applying an analysis algorithm to one or more gated compound populations includes dragging the analysis algorithm displayed in the first pane onto the gated compound population displayed in the second pane. In other instances, applying an analysis algorithm to one or more gated compound populations includes selecting an analysis algorithm from a menu of analysis algorithms and applying the selected algorithm to the gated compound population displayed in the second pane. In certain instances, an icon is displayed in the second pane on the gated compound population in response to applying the analysis algorithm from the first pane. In some embodiments, applying the analysis algorithm to the gated compound population in the second pane is sufficient to apply the analysis algorithm to one or more sub-groups in the hierarchy of applied data gates. In some instances, applying the analysis algorithm to the gated compound population is sufficient to apply the analysis algorithm to all of the sub-groups in the hierarchy of applied data gates. In some embodiments, methods include applying an analysis algorithm displayed in the second pane (e.g., tSNE, x-shift algorithm) to one or more of the data files for the samples displayed in the third pane. In certain instances, applying the analysis algorithm includes dragging an analysis algorithm displayed in the second pane onto a data file for a sample displayed in the third pane.

Figure 3:
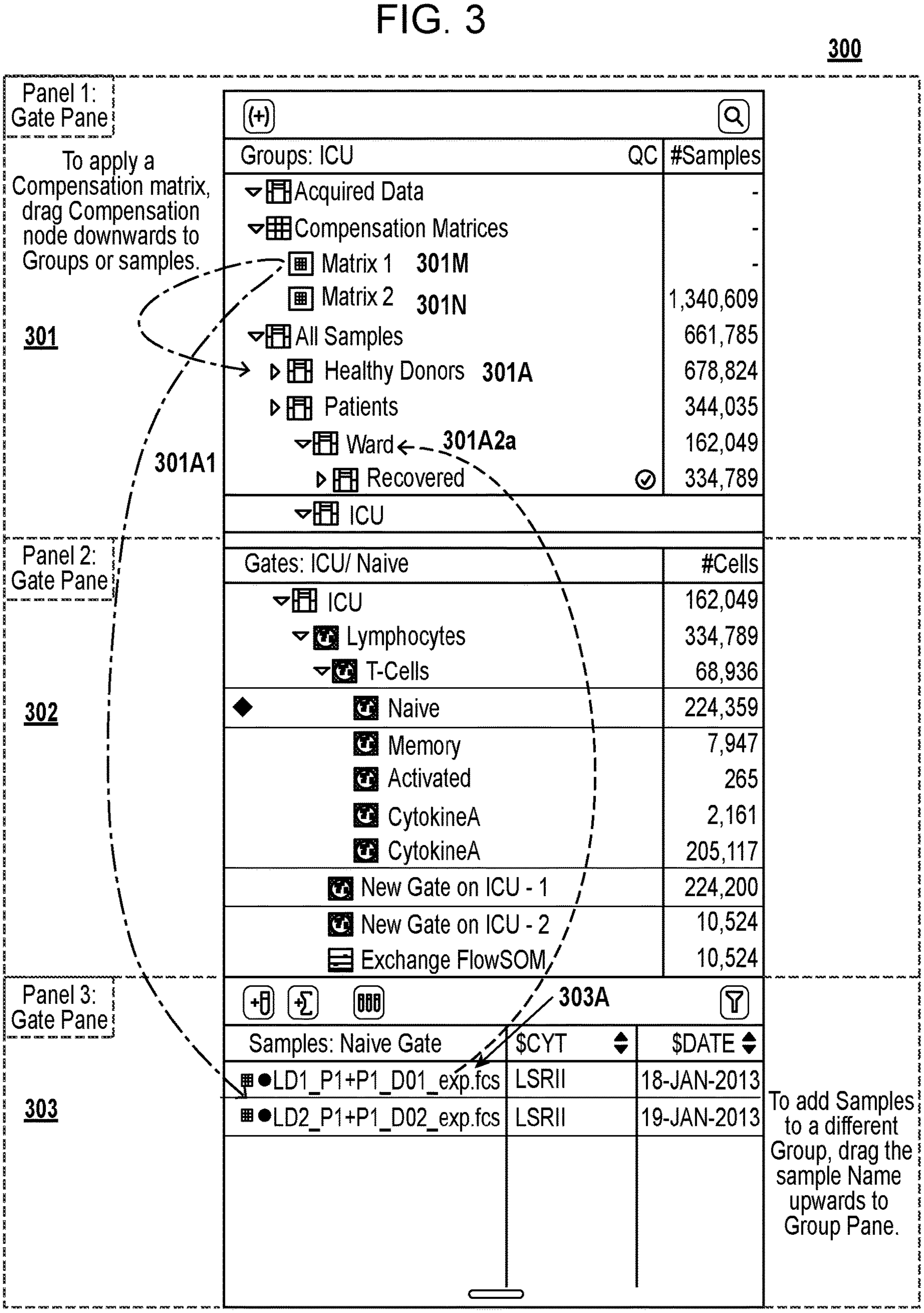
FIG. 3 depicts the use of a graphical user interface for group-wise analysis of flow cytometry data according to certain embodiments.

FIG. 3 depicts the use of a graphical user interface for group-wise analysis of flow cytometry data according to certain embodiments. Graphical user interface 300 includes first pane 301 that depicts compound populations that includes cytometry data of one or more groups of samples as discussed above in FIG. 2. An analysis algorithm (e.g., compensation matrix 301M or 310N) can be applied to one or more of the compound populations of first pane 301 by dragging the analysis algorithm onto the compound population of interest. This is shown in FIG. 3 by an arrow from compensation matrix 301N to population 301A1 ("healthy donors"). In some embodiments, dragging compensation matrix 301M onto population 301A1 is sufficient to apply the compensation matrix to all of the sub-groups of compound population 301A1. In some embodiments, an analysis algorithm can be applied to an entire sample, such as depicted where compensation matrix 301M is dragged onto a sample in third pane 303. Applying the analysis algorithm from first pane 301 in certain instances is sufficient to apply the analysis algorithm to all compound populations which include events from the sample. Samples from third pane 303 can be added to different compound populations in first pane 301. To add flow cytometry data from a sample to a compound population (e.g., generating a compound population having events with data accessors to the raw data in the selected sample), one or more of the samples shown in third pane 303 can be dragged onto a compound population shown in first pane 301. As depicted in FIG. 3B, sample 303A from third pane 303 is dragged onto compound population 301A2*a* (hospital "ward" sub-group).

In some embodiments, the cytometry data includes data which is provided or represented in flow cytometry standard format. In certain embodiments, the cytometry data is selected from one or more of flow cytometry data, mass cytometry data or genomic cytometry (e.g., RNA-seq data). In certain instances, the cytometry data is flow cytometry data. Flow cytometry data for practicing the subject methods in some instances is generated by detecting light from a sample having particles in a flow stream irradiated with a light source. In some embodiments, methods include irradiating a sample propagating through the flow stream across an interrogation region of the flow stream of 5 μm or more, such as 10 μm or more, such as 15 μm or more, such as 20 μm or more, such as 25 μm or more, such as 50 μm or more, such as 75 μm or more, such as 100 μm or more, such as 250 μm or more, such as 500 μm or more, such as 750 μm or more, such as for example across an interrogation region of 1 mm or more, such as 2 mm or more, such as 3 mm or more, such as 4 mm or more, such as 5 mm or more, such as 6 mm or more, such as 7 mm or more, such as 8 mm or more, such as 9 mm or more and including 10 mm or more.

In some embodiments, the methods include irradiating the sample in the flow stream with a continuous wave light source, such as where the light source provides uninterrupted light flux and maintains irradiation of particles in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, methods may include irradiating the sample in the flow stream with a continuous light source that provides for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In other embodiments, the methods include irradiating the sample propagating through the flow stream with a pulsed light source, such as where light is emitted at predetermined time intervals, each time interval having a predetermined irradiation duration (i.e., pulse width). In certain embodiments, methods include irradiating the particle with the pulsed light source in each interrogation region of the flow stream with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 KHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 KHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

The flow stream may be irradiated with any convenient light source and may include laser and non-laser light sources (e.g., light emitting diodes). In certain embodiments, methods include irradiating the sample with a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:$YVO_4$ laser, Nd:$YCa_4O(BO_3)_3$ laser, Nd:YCOB laser, titanium sapphire laser, thulim YAG laser, ytterbium YAG laser, ytterbium$_2O_3$ laser or cerium doped lasers and combinations thereof.

In some embodiments, the light source outputs a specific wavelength such as from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

The flow stream may be irradiated by the light source from any suitable distance, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, irradiation of the flow stream may be at any suitable angle such as at an angle ranging from 10° to 90°, such as from 15° to 85°, such as from 20° to 80°, such as from 25° to 75° and including from 30° to 60°, for example at a 90° angle.

In some embodiments, methods include further adjusting the light from the sample before detecting the light. For example, the light from the sample source may be passed through one or more lenses, mirrors, pinholes, slits, gratings, light refractors, and any combination thereof. In some instances, the collected light is passed through one or more focusing lenses, such as to reduce the profile of the light. In other instances, the emitted light from the sample is passed through one or more collimators to reduce light beam divergence.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. *Nature Photonics Vol.* 7(10); 806-810 (2013), as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In certain embodiments, light from the sample irradiated in the flow stream is detected. In embodiments, methods may include detecting light at 10 positions (e.g., segments of a predetermined length) or more across the flow stream, such as 25 positions or more, such as 50 positions or more, such as 75 positions or more, such as 100 positions or more, such as 150 positions or more, such as 200 positions or more, such as 250 positions or more and including 500 positions or more of the flow stream. In some embodiments, light from the flow stream is detected with a photodetector. Photodetectors may be any convenient light detecting protocol, including but not limited to photosensors or photodetectors, such as active-pixel sensors (APSs), avalanche photodiodes (APDs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Light may be measured by the photodetector at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths. Light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval. Measurements of the light from across the flow stream may be taken one or more times during each discrete time interval, such as 2 or more times, such as 3 or more times, such as 5 or more times and including 10 or more times. In certain embodiments, the light from the flow stream is measured by the photodetector 2 or more times, with the data in certain instances being averaged.

Systems for Group-Wise Analysis of Cytometer Data

Aspects of the present disclosure also include systems for processing cytometer data. Systems according to certain embodiments include an input module configured to receive cytometer data from one or more samples having particles and a processor having memory operably coupled to the processor where the memory includes instructions stored thereon which when executed by the processor cause the processor to generate a compound population of events having data accessors from the cytometry data. As discussed above, the subject systems provide for group-wise analysis of the cytometer data such as where samples may be arranged into a hierarchy of groups and data analysis (e.g., applying data gates or an analysis algorithm) may be conducted on events in a multitude of different samples without generating a cytometry data file that combines all of the raw data. In certain instances, systems include memory having instructions for applying data gates or analysis algorithm to events from two or more different samples without concatenating the raw cytometry data files of each sample. In some embodiments, the memory includes instructions for comparative analysis of a collection of samples based on controlled characteristics while retaining source identity without encoding sample groups together (e.g., by filename, folder structure or staining panel).

In embodiments, systems include a processor having memory operably coupled to the processor where the memory includes instructions stored thereon, which when executed by the processor, cause the processor to generate a compound population of events that include data accessors from cytometry data collected from one or more samples having particles. In some embodiments, the compound population includes 2 events or more, such as 3 or more, such as 5 or more, such as 10 or more, such as 25 or more, such as 50 or more, such as 100 or more, such as 250 or more, such as 500 or more, such as 1000 or more, such as 2500 or more, such as 5000 or more and including where the compound population includes cytometry data that is collected for 10000 events or more. The compound population may include the cytometry data of 1% or more of the events collected for each of the samples, such as 2% or more, such as 3% or more, such as 4% or more, such as 5% or more, such as 10% or more, such as 15% or more, such as 25% or more, such as 50% or more, such as 75% or more, such as 90% or more and including the cytometry data of 99% or more of the events collected for the two or more samples.

In some embodiments, the memory includes instructions for generating a compound population that includes events from 1 or more different samples, such as 2 or more, such as 3 or more, such as 4 or more, such as 5 or more, such as 6 or more, such as 7 or more, such as 8 or more, such as 9 or more, such as 10 or more, such as 15 or more, such as 25 or more and including cytometry data that is collected from 50 or more different samples. In some instances, the memory includes instructions for generating a gated compound population by applying a data gate (e.g., a gate for lymphocytes or a gate for one or more fluorescent markers) to events from one or more different samples.

In some embodiments, the memory includes instructions for generating a compound population from cytometer data generated from data signals collected from one or more of a side-scattered light photodetector, a forward-scattered light photodetector, a fluorescence photodetector and a light loss photodetector for each event in a sample. In some embodiments, the memory includes instructions for retaining cytometry data of the compound population as separate raw data files collected for each of the samples. In some instances, the memory includes instructions to not concatenate raw data files to form a single combined data file.

In some embodiments, the memory includes instructions for applying a data gate to the compound population to generate a gated compound population. In some instances, the memory include instructions for applying a data gate to a plurality of events of the compound population by applying the data gate to a single event of a compound population. For example, the memory includes instructions for applying a data gate to an event of a compound population such that the data gate may be applied to 1% or more of the remaining events of the compound population, such as 2% or more, such as 3% or more, such as 4% or more, such as 5% or more, such as 10% or more, such as 25% or more, such as 50% or more, such as 75% or more, such as 90% or more, such as 95% or more, such as 97% or more and including 99% or more of the events of the compound population. In certain instances, the memory includes instructions for applying a data gate to all of the events (i.e., 100%) of the compound population by applying a data gate to a single event of a compound population.

In some embodiments, the memory includes instructions for applying a hierarchy of data gates to the compound population. In some instances, applying a hierarchy of data gates to the compound population is sufficient to generate a hierarchy of descendant gated compound populations. In some instances, the hierarchy of data gates generates at least one descendant gated compound population. In certain instances, the memory includes instructions for applying two or more hierarchies of data gates to a compound population to generate 2 or more different descendent gated compound populations, such as 3 or more, such as 4 or more, such as 5 or more and including 10 or more.

In one example, a hierarchy of applied data gates may include a data gate which gates a compound population generated from cytometry data collected from a biological sample. In certain instances, a first gated compound population corresponds to events of diseased sample cells and a second gated compound population corresponds to events of normal sample cells. The first gated compound population (composed of event data from diseased sample cells) may include a compound population corresponding to lymphocytes. The lymphocyte compound population includes single cells. The singles cells population includes compound populations which correspond to B cells and to T cells. In this example, the first hierarchy of data gates applied to the compound population generates the gated compound population of diseased cells and the gated compound populations corresponding to lymphocytes, single cells, B cells and T cells.

In some instances, the memory includes instructions for applying an analysis algorithm to the compound population. Any convenient analysis algorithm can be applied to events of the compound population, such as for example a compensation algorithm or a clustering algorithm. In certain instances, the memory includes instructions for applying a spectral unmixing algorithm, such as described in U.S. Pat. No. 11,009,400 and International Patent Application No. PCT/US2021/46741 filed on Aug. 19, 2021, the disclosures of which are herein incorporated by reference.

In certain embodiments, the memory includes instructions for desynchronizing a data gate for one or more samples of the gated compound populations. In some instances, desynchronizing a data gate is sufficient to exclude one or more events from a gated compound population. For example, desynchronizing a data gate for one or more samples of the gated compound population is sufficient to exclude 2 or more events from the gated compound population, such as 5 or more, such as 10 or more, such as 25 or more, such as 50 or more, such as 100 or more and including excluding 250 or more. In some embodiments, the memory includes instructions for desynchronizing one or more events from the compound population by changing the geometry of a data gate that is applied to one or more samples of the gated compound population. In some embodiments, the memory includes instructions for desynchronizing a data gate based on some parameter of interest, such as for example for example, particle size, particle center of mass, particle eccentricity, or optical, impedance, or temporal properties. In some embodiments, the memory includes instructions for desynchronizing data gates (e.g., changing gate geometry) for a plurality of samples sequentially (i.e., one at a time for each sample of the compound population).

In some instances, systems include a display with a graphical user interface for use in group-wise analysis of the cytometry data according to the methods described herein. In some instances, the graphical user interface is a three pane graphical user interface, such as where the user interface is optimized for visualizing and applying data gates to compound populations generated from raw data files of two or more different samples. In some instances, the graphical user interface includes a first pane configured to display one or more ungated compound populations that includes cytometry data of one or more groups of samples, a second pane configured to display one or more gated compound populations and a third pane configured to display the data files for each of the samples used to generate the compound populations. In some instances, the second pane is configured to display a hierarchy of gated compound populations selected in the first pane of the graphical user interface. In some instances, the second pane is configured to display analysis algorithms applied to the events of the compound population that is selected in the first pane, such as clustering algorithms or compensation matrices applied to compound populations displayed in the first pane. In some embodiments, the hierarchy of gated compound populations are color-coded in the second pane. In one example, each of the inherited data gates are labeled in the same color. In some instances, desynchronized data gates are visualized in the second pane. In some instances, each desynchronized data gate is visualized in the second pane by a distinct text font. In some embodiments, the third pane of the graphical user interface is configured to display data files for each sample having events within a gated compound population that is selected in the second pane.

In some embodiments, the memory includes instructions for applying an analysis algorithm that is displayed in the first pane to one or more of the gated compound populations displayed in the second pane. In certain instances, the memory includes instructions for applying an analysis algorithm to one or more gated compound populations by dragging the analysis algorithm displayed in the first pane onto the gated compound population displayed in the second pane. In other instances, the memory includes instructions for applying an analysis algorithm to one or more gated compound populations by selecting an analysis algorithm from a menu of analysis algorithms and applying the selected algorithm to the gated compound population displayed in the second pane. In certain instances, the memory includes instructions for displaying an icon in the second pane of the graphical user interface on the gated compound population in response to applying the analysis algorithm from the first pane. In some embodiments, the memory includes instructions for applying the analysis algorithm to the gated compound population in the second pane such that the analysis algorithm is applied to one or more sub-groups in the hierarchy of applied data gates. In some instances, applying the analysis algorithm to the gated compound population is sufficient to apply the analysis algorithm to all of the sub-groups in the hierarchy of applied data gates. In some embodiments, the memory includes instructions for applying an analysis algorithm displayed in the second pane (e.g., tSNE, x-shift algorithm) to one or more of the data files for the samples displayed in the third pane. In certain instances, applying the analysis algorithm includes dragging an analysis algorithm displayed in the second pane onto a data file for a sample displayed in the third pane.

In some embodiments, the memory includes instructions for applying an analysis algorithm displayed in the first pane to one or more of the data files for the samples displayed in the third pane. In certain instances, the memory includes instructions for applying the analysis algorithm by dragging an analysis algorithm displayed in the first pane onto a data file for a sample displayed in the third pane. In other instances, the memory includes instructions for applying an analysis algorithm to one or more of the data files for the samples displayed in the third pane by selecting an analysis algorithm from a menu of analysis algorithms and applying the selected algorithm to one or more of the data files for the samples displayed in the third pane.

In some embodiments, systems are part of or operationally coupled to a particle analyzer system (e.g., a flow cytometer) for generating the flow cytometer data described herein. In some instances, systems include a light source for irradiating a sample having particles in a flow stream. Systems of interest include a light source configured to irradiate a sample in a flow stream. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:$YVO_4$ laser, Nd:$YCa_4O(BO_3)_3$ laser, Nd:YCOB laser, titanium sapphire laser, thulim YAG laser, ytterbium YAG laser, ytterbium$_2O_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, systems include a light detection system having one or more photodetectors for detecting and measuring light from the sample. Photodetectors of interest may be configured to measure light absorption (e.g., for brightfield light data), light scatter (e.g., forward or side scatter light data), light emission (e.g., fluorescence light data) from the sample or a combination thereof. Photodetectors of interest may include, but are not limited to optical sensors, such as active-pixel sensors (APSs), avalanche photodiodes (APDs), image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm and a length that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm, where the surface area of each photodetector (e.g., photodiode) in the array ranges from 25 to $μm^2$ to 10000 $μm^2$, such as from 50 to $μm^2$ to 9000 $μm^2$, such as from 75 to $μm^2$ to 8000 $μm^2$, such as from 100 to $μm^2$ to 7000 $μm^2$, such as from 150 to $μm^2$ to 6000 $μm^2$ and including from 200 to $μm^2$ to 5000 $μm^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 $mm^2$ to 10000 $mm^2$, such as from 0.5 $mm^2$ to 5000 $mm^2$, such as from 1 $mm^2$ to 1000 $mm^2$, such as from 5 $mm^2$ to 500 $mm^2$, and including from 10 $mm^2$ to 100 $mm^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, the light detection system is configured to detect light from a plurality of different positions of the flow stream. In some embodiments, the light detection system is configured to detect light from flow stream at 10 positions (e.g., segments of a predetermined length) or more, such as 25 positions or more, such as 50 positions or more, such as 75 positions or more, such as 100 positions or more, such as 150 positions or more, such as 200 positions or more, such as 250 positions or more and including 500 positions or more of the flow stream. In some embodiments, the light detection system is configured to detect light simultaneously from each position of the flow stream. In some embodiments, the light detection system includes an imaging photodetector which detects light simultaneously across the flow stream in a plurality of pixel locations. For example, the imaging photodetector may be configured to detect light from the flow stream at 10 pixel locations or more across the flow stream, such as 25 pixel locations or more, such as 50 pixel locations or more, such as 75 pixel locations or more, such as 100 pixel locations or more, such as 150 pixel locations or more, such as 200 pixel locations or more, such as 250 pixel locations or more and including 500 pixel locations or more across the horizontal axis of the flow stream. In some instances, each pixel location corresponds to a different position of the flow stream.

In certain embodiments, systems further include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 μL/min or more, such as 2 μL/min or more, such as 3 μL/min or more, such as 5 μL/min or more, such as 10 μL/min or more, such as 15 μL/min or more, such as 25 L/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross-sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 μL/min (microliter per minute) or more, such as 2 μL/min or more, such as 3 μL/min or more, such as 5 μL/min or more, such as 10 μL/min or more, such as 25 μL/min or more, such as 50 μL/min or more, such as 75 μL/min or more, such as 100 μL/min or more, such as 250 μL/min or more, such as 500 μL/min or more, such as 750 μL/min or more and including 1000 μL/min or more. For example, the system may include a pump that is configured to flow sample through the flow cell at a rate that ranges from 1 μL/min to 500 μL/min, such as from 1 μL/min to 250 μL/min, such as from 1 μL/min to 100 μL/min, such as from 2 μL/min to 90 μL/min, such as from 3 μL/min to 80 μL/min, such as from 4 μL/min to 70 μL/min, such as from 5 μL/min to 60 μL/min and including rom 10 μL/min to 50 μL/min. In certain embodiments, the flow rate of the flow stream is from 5 μL/min to 6 μL/min.

In certain embodiments, light detection systems having the plurality of photodetectors as described above are part of or positioned in a particle analyzer, such as a particle sorter. In certain embodiments, the subject systems are flow cytometric systems that includes the photodiode and amplifier component as part of a light detection system for detecting light emitted by a sample in a flow stream. Suitable flow cytometry systems may include, but are not limited to, those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry,* 3rd ed., Wiley-Liss (1995); Virgo, et al. (2012) *Ann Clin Biochem.* January; 49(pt 1): 17-28; Linden, et. al., *Semin Throm Hemost.* 2004 October; 30 (5): 502-11; Alison, et al. *J Pathol,* 2010 December; 222 (4): 335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ || flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSR-Fortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ || cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In some embodiments, the subject systems are particle sorting systems that are configured to sort particles with an enclosed particle sorting module, such as those described in U.S. Patent Publication No. 2017/0299493, the disclosure of which is incorporated herein by reference. In certain embodiments, particles (e.g, cells) of the sample are sorted using a sort decision module having a plurality of sort decision units, such as those described in U.S. Patent Publication No. 2020/0256781, the disclosure of which is incorporated herein by reference. In some embodiments, the subject systems include a particle sorting module having deflector plates, such as described in U.S. Patent Publication No. 2017/0299493, filed on Mar. 28, 2017, the disclosure of which is incorporated herein by reference.

In certain instances, flow cytometry systems of the invention are configured for imaging particles in a flow stream by fluorescence imaging using radiofrequency tagged emission (FIRE), such as those described in Diebold, et al. *Nature Photonics* Vol. 7 (10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 4A:
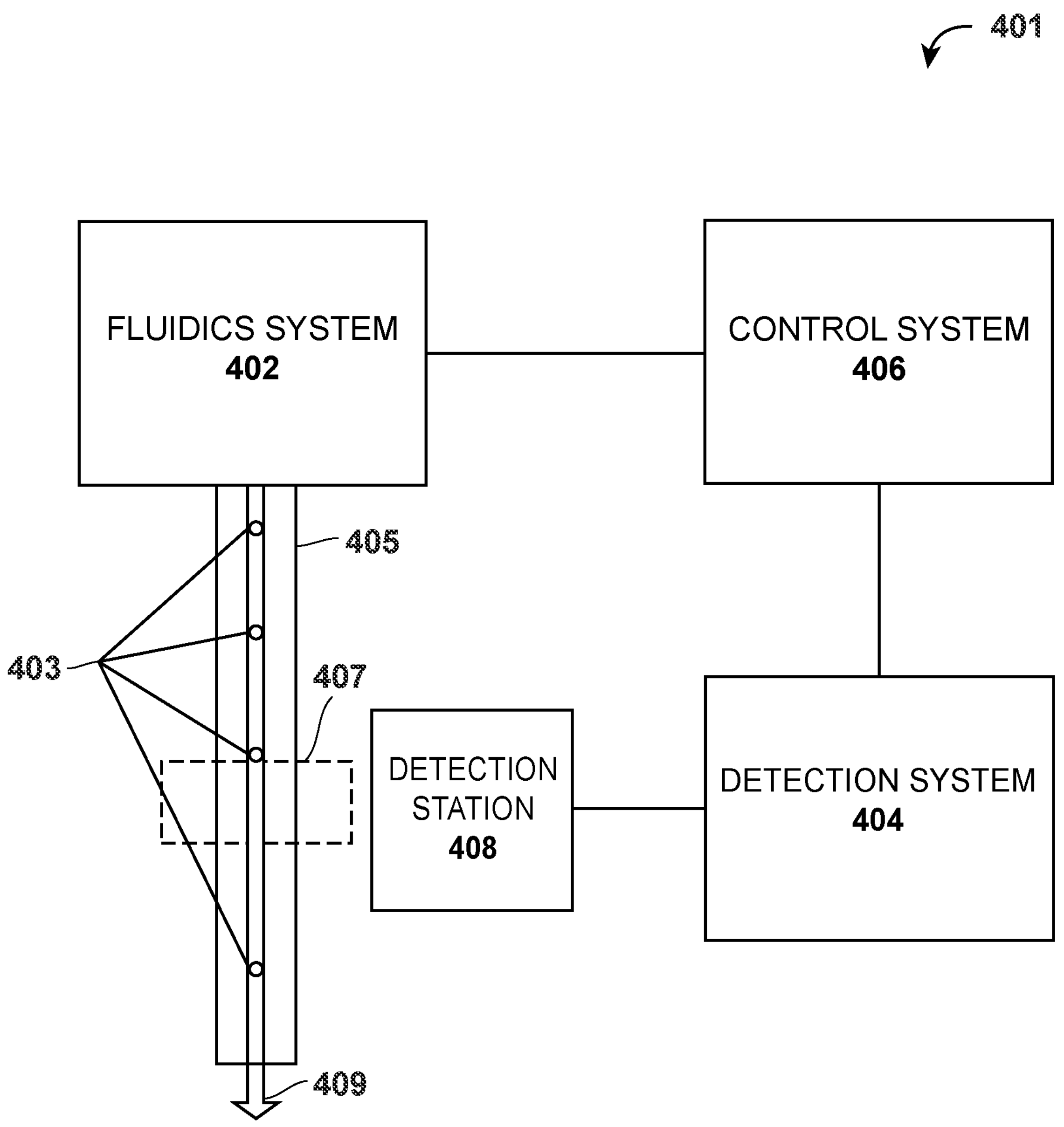
FIG. 4A depicts a functional block diagram of a particle analysis system according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first-time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first-time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
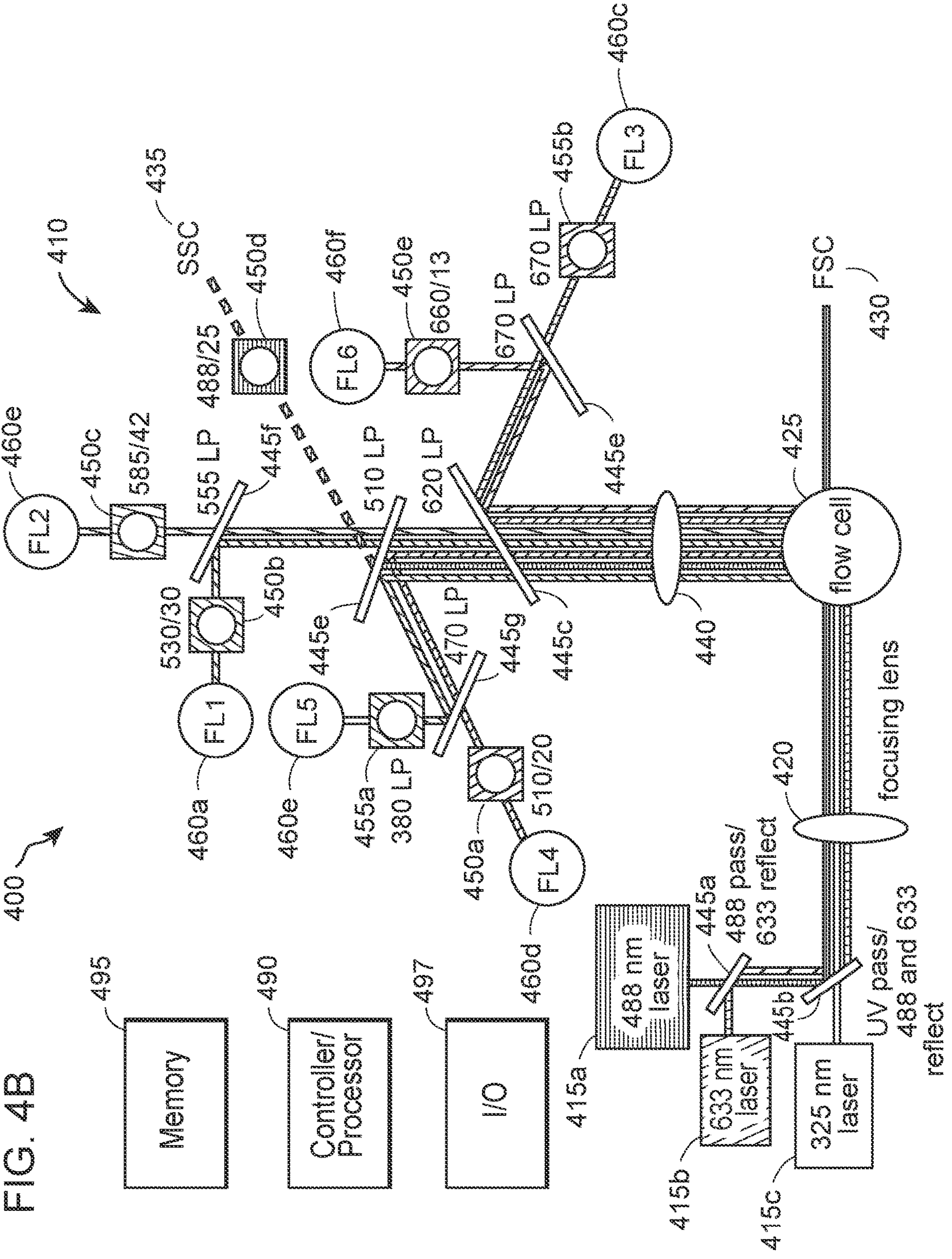
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415*a*-415*c*, a focusing lens 420, a flow chamber 425, a forward scatter detector 430, a side scatter detector 435, a fluorescence collection lens 440, one or more beam splitters 445*a*-445*g*, one or more bandpass filters 450*a*-450*e*, one or more longpass ("LP") filters 455*a*-455*b*, and one or more fluorescent detectors 460*a*-460*f*.

The excitation lasers 115*a-c* emit light in the form of a laser beam. The wavelengths of the laser beams emitted from excitation lasers 415*a*-415*c* are 488 nm, 633 nm, and 325 nm, respectively, in the example system of FIG. 4B. The laser beams are first directed through one or more of beam splitters 445*a* and 445*b*. Beam splitter 445*a* transmits light at 488 nm and reflects light at 633 nm. Beam splitter 445*b* transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460*a*-460*f* through one or more of the beam splitters 445*a*-445*g*, the bandpass filters 450*a*-450*e*, the longpass filters 455*a*-455*b*, and the fluorescence collection lens 440.

The fluorescence collection lens 440 collects light emitted from the particle-laser beam interaction and routes that light towards one or more beam splitters and filters. Bandpass filters, such as bandpass filters 450*a*-450*e*, allow a narrow range of wavelengths to pass through the filter. For example, bandpass filter 450*a* is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455*a*-455*b*, transmit wavelengths of light equal to or longer than a specified wavelength of light. For example, longpass filter 455*a*, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445*g* is a 620 SP beam splitter, meaning that the beam splitter 445*g* transmits wavelengths of light that are 620 nm or shorter and reflects wavelengths of light that are longer than 620 nm in a different direction. In one embodiment, the beam splitters 445*a*-445*g* can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460*a*-460*f*. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
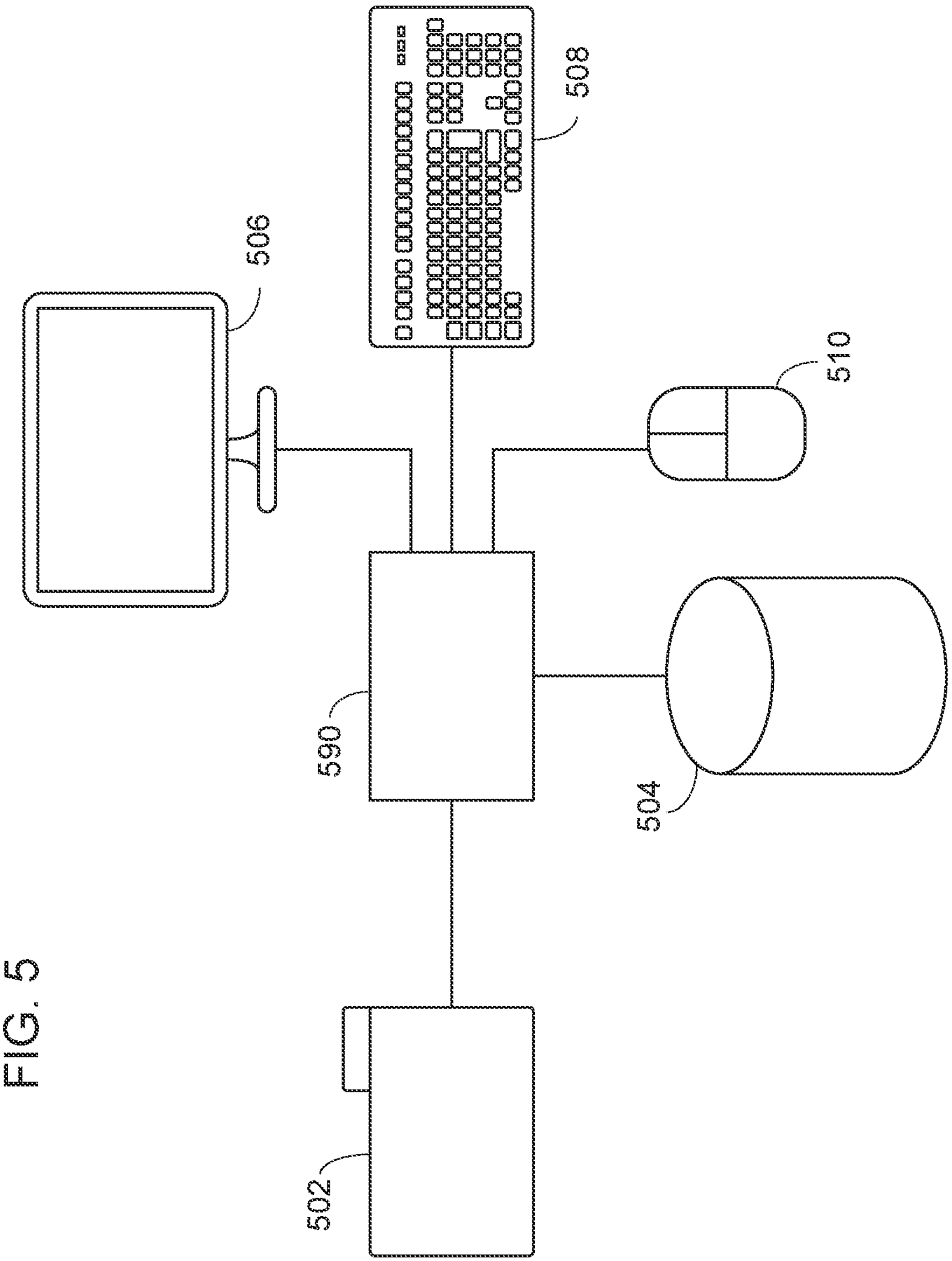
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
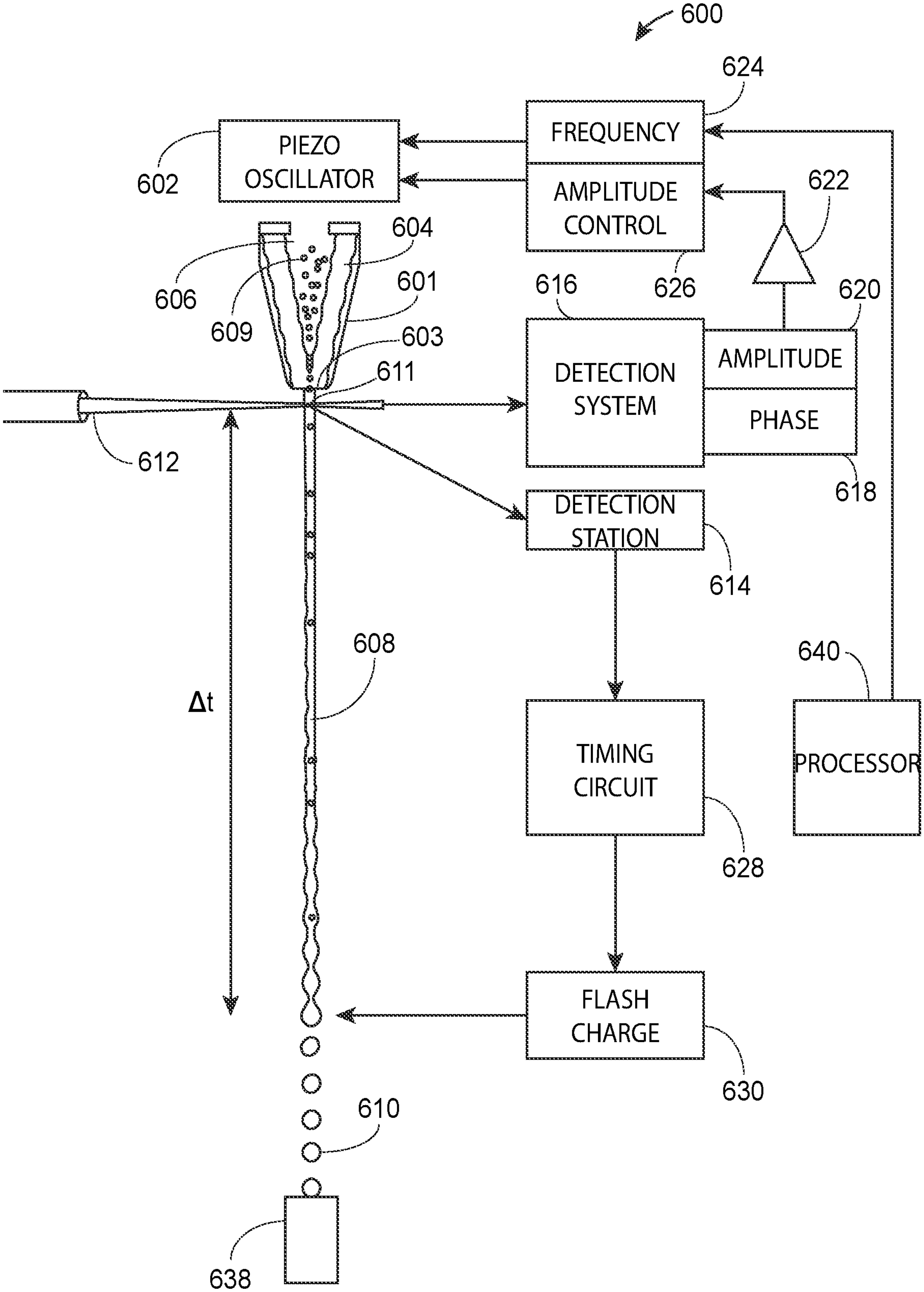
FIG. 6A depicts a schematic drawing of a particle sorter system according to certain embodiments.

FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g., a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay ($\Delta t$), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g., a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
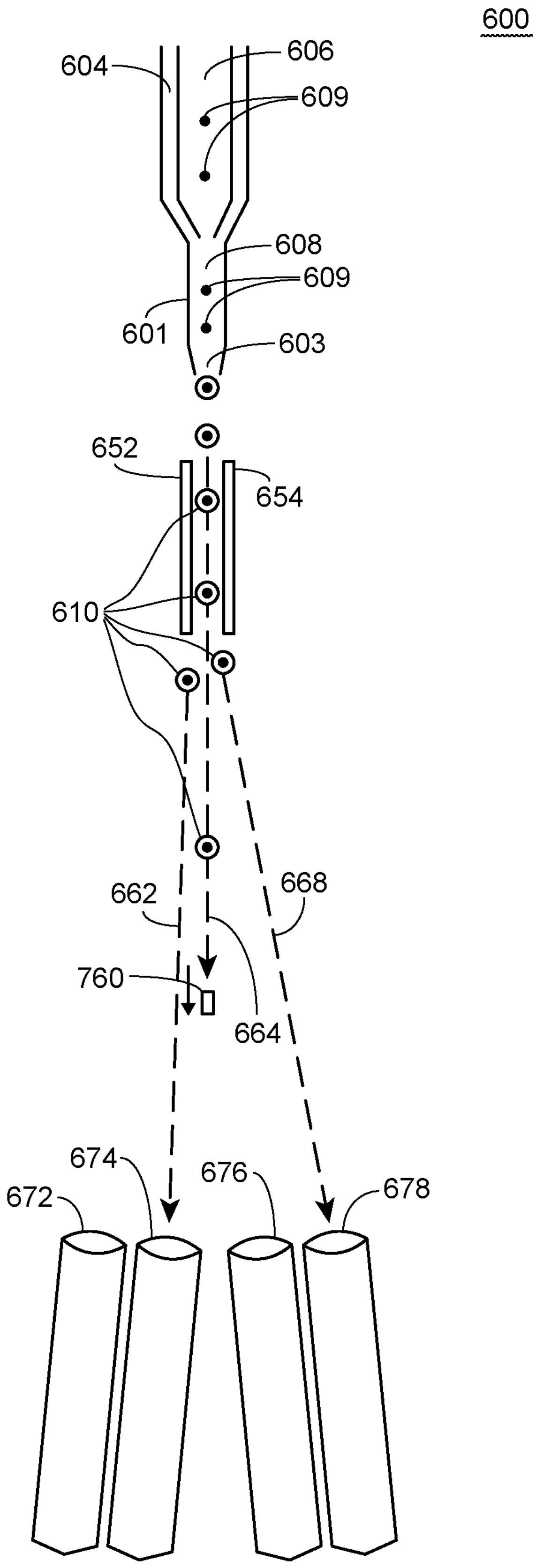
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, NJ).

Computer-Controlled Systems

Aspects of the present disclosure further include computer-controlled systems, where the systems further include one or more computers for complete automation or partial automation of the methods described herein. In some embodiments, systems include a computer having a computer readable storage medium with a computer program stored thereon, where the computer program when loaded on the computer includes instructions for generating a compound population of events comprising data accessors from cytometry data. In some embodiments, the computer program includes instructions for generating a compound population of events that include data accessors from the cytometry data. In some instances, the computer program includes instructions for processing cytometer data generated based on data signals from scattered light detector channels (e.g., forward scatter image data, side scatter image data). In other instances, the computer program includes instructions for processing cytometer data generated based on data signals from one or more fluorescence detector channels. In other instances, the computer program includes instructions for processing cytometer data generated based on data signals from one or more light loss detector channels. In still other instances, the computer program includes instructions for processing cytometer data generated based on data signals from a combination of data signals from two or more of light scatter detector channels, fluorescence detector channels and light loss detector channels.

In some instances, the computer program includes instructions for generating a compound population from cytometry data from two or more different samples, such as three or more different samples, such as four or more different samples, such as five or more different samples and including instructions for generating a compound population from cytometry data collected from ten or more different samples. In some embodiments, the computer program includes instructions for generating a compound population that includes data accessors for each event of the cytometry data. In some embodiments, the computer program includes instructions for accessing metadata for each event of the cytometry data using the data accessors, such as accessing the metadata associated with the raw data files collected for each sample. In some embodiments, the data accessors include source identity for each event of the samples. In some instances, the computer program includes instructions for generating a compound population from cytometry data from two or more different samples where the raw data from each sample is retained as separate data files. In certain instances, the computer program includes instructions for generating the compound population from cytometry data from two or more different samples where the raw data files from each sample are not concatenated to form a single combined data file.

In some embodiments, the computer program includes instructions for applying a data gate to the compound population to generate a gated compound population. In some instances, the computer program includes instructions for applying a hierarchy of data gates to the compound population. In some instances, the computer program includes instructions for applying a hierarchy of data gates to the compound population to generate a hierarchy of gated compound populations. In some instances, the computer program includes instructions for applying the data gate to one event of the compound population, where in certain instances applies the data gate to a plurality of events in the compound population. In certain instances, applying the data gate to a single event of the compound population provides for applying the data gate to every event in the compound population. In some embodiments, the computer program includes instructions for defining one or more subpopulation of events of the compound population where application of a data gate is sufficient to apply the data gate all of the events of the subpopulation. In some embodiments, the computer program includes instructions for applying an analysis algorithm to the gated compound population, such as instructions for applying a clustering algorithm or a compensation matrix to the gated compound population.

In certain embodiments, the computer program includes instructions for desynchronizing a data gate for one or more samples of the gated compound population. In some instances, the computer program includes instructions for desynchronizing a data gate by changing the geometry of a data gate applied to one or more samples of the gated compound population. In certain instances, the computer program includes instructions for desynchronizing a data gate (e.g., changing gate geometry) for a plurality of samples, such as where data gates are desynchronized sequentially (i.e., one at a time) for each sample of the compound population.

In some embodiments, the computer program includes instructions for generating a graphical user interface that includes a first pane configured that displays one or more ungated compound populations that includes cytometry data of one or more groups of samples, a second pane that displays one or more gated compound populations; and a third pane that displays data files for each of the samples used to generate the compound populations. In some instances, the computer program includes instructions for generating a graphical user interface where the second pane displays a hierarchy of gated compound populations. In some instances, the second pane displays analysis algorithms applied to the events of the compound population that is selected in the first pane, such as clustering algorithms or compensation matrices applied to compound populations displayed in the first pane. In some embodiments, the hierarchy of gated compound populations are color-coded in the second pane. In some examples, each of the inherited data gates are labeled in the same color. In some instances, the computer program includes instructions for generating a graphical user interface which visualizes desynchronized data gates in the second pane. In some instances, each desynchronized data gate is visualized in the second pane by a distinct text font. In some embodiments, the computer program includes instructions for displaying in the third pane of the graphical user interface data files for each sample having events within a gated compound population that is selected in the second pane.

In some embodiments, the computer program includes instructions for applying an analysis algorithm that is displayed in the first pane to one or more of the gated compound populations displayed in the second pane. In certain instances, the computer program includes instructions for applying an analysis algorithm to one or more gated compound populations by dragging the analysis algorithm displayed in the first pane onto the gated compound population displayed in the second pane. In other instances, the computer program includes instructions for applying an analysis algorithm to one or more gated compound populations by selecting an analysis algorithm from a menu of analysis algorithms and applying the selected algorithm to the gated compound population displayed in the second pane. In certain instances, the computer program includes instructions for displaying an icon in the second pane of the graphical user interface on the gated compound population in response to applying the analysis algorithm from the first pane. In some embodiments, the computer program includes instructions for applying the analysis algorithm to the gated compound population in the second pane such that the analysis algorithm is applied to one or more sub-groups in the hierarchy of applied data gates. In some instances, applying the analysis algorithm to the gated compound population is sufficient to apply the analysis algorithm to all of the gated compound populations in the hierarchy of applied data gates.

In some embodiments, the computer program includes instructions for applying an analysis algorithm displayed in the first pane to one or more of the data files for the samples displayed in the third pane. In certain instances, the computer program includes instructions for applying the analysis algorithm by dragging an analysis algorithm displayed in the first pane onto a data file for a sample displayed in the third pane. In other instances, the computer program includes instructions for applying an analysis algorithm to one or more of the data files for the samples displayed in the third pane by selecting an analysis algorithm from a menu of analysis algorithms and applying the selected algorithm to one or more of the data files for the samples displayed in the third pane. In some embodiments, the computer program includes instructions for applying an analysis algorithm displayed in the second pane (e.g., tSNE, x-shift algorithm) to one or more of the data files for the samples displayed in the third pane. In certain instances, the computer program includes instructions for applying the analysis algorithm by dragging an analysis algorithm displayed in the second pane onto a data file for a sample displayed in the third pane.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows, iOS, Oracle Solaris, Linux, IBM i, Unix, and others.

Figure 7:
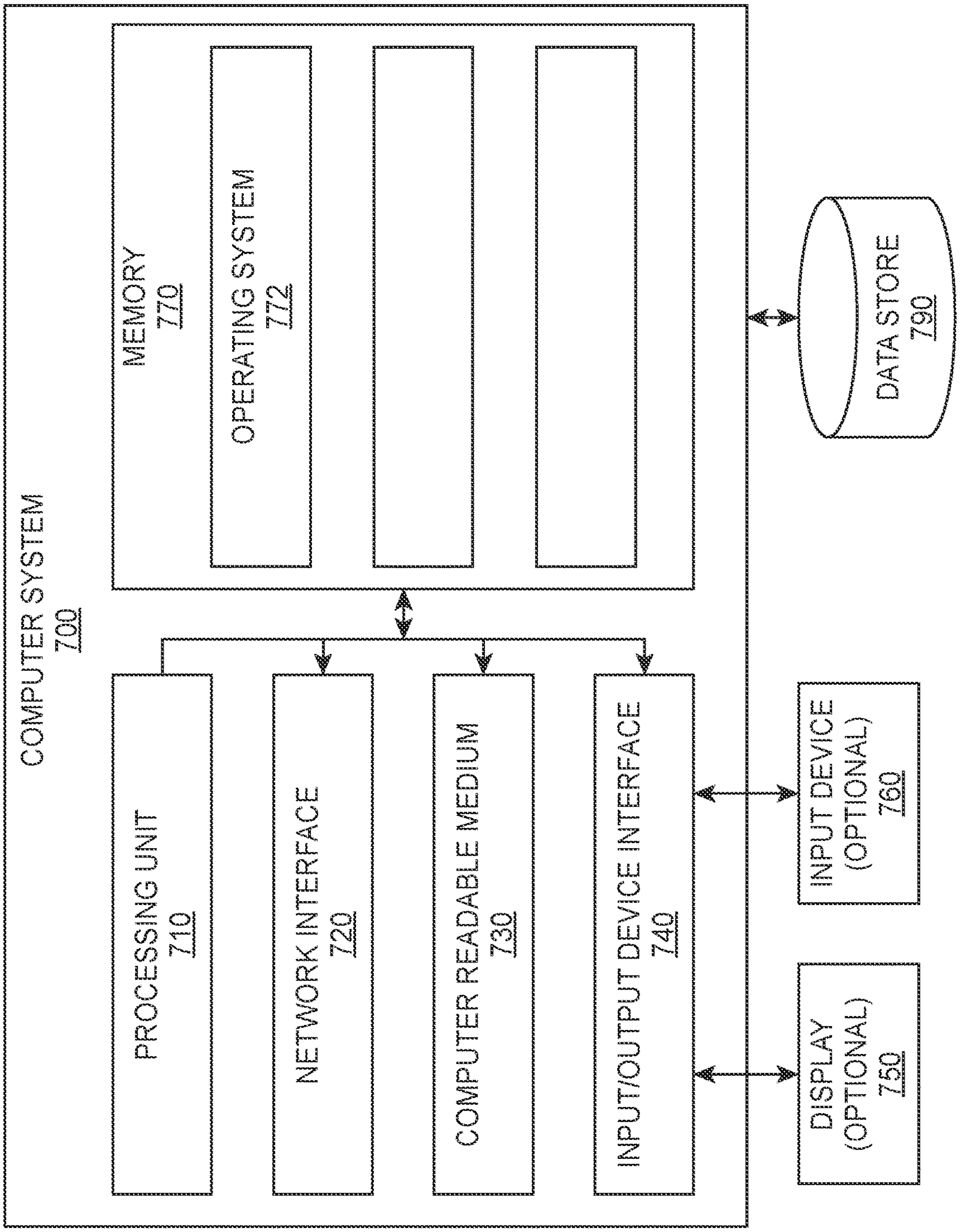
FIG. 7 depicts a block diagram of a computing system according to certain embodiments.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Non-Transitory Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Python, Java, Java Script, C, C#, C++, Go, R, Swift, PHP, as well as any many others.

Non-transitory computer readable storage medium according to certain embodiments includes instructions having algorithm for generating a compound population of events that include data accessors from the cytometry data. In some instances, the non-transitory computer readable storage medium includes algorithm for processing cytometer data generated based on data signals from scattered light detector channels (e.g., forward scatter image data, side scatter image data). In other instances, the non-transitory computer readable storage medium includes algorithm for processing flow cytometer data generated based on data signals from one or more fluorescence detector channels. In other instances, the non-transitory computer readable storage medium includes algorithm for processing cytometer data generated based on data signals from one or more light loss detector channels. In still other instances, the non-transitory computer readable storage medium includes algorithm for processing cytometer data generated based on data signals from a combination of data signals from two or more of light scatter detector channels, fluorescence detector channels and light loss detector channels.

In some instances, the non-transitory computer readable storage medium includes algorithm for generating a compound population from flow cytometry data from two or more different samples, such as three or more different samples, such as four or more different samples, such as five or more different samples and including instructions for generating a compound population from cytometry data collected from ten or more different samples. In some embodiments, the non-transitory computer readable storage medium includes algorithm for generating a compound population that includes data accessors for each event of the cytometry data. In some embodiments, the non-transitory computer readable storage medium includes algorithm for accessing metadata for each event of the cytometry data using the data accessors, such as accessing the metadata associated with the raw data files collected for each sample. In some embodiments, the data accessors include source identity for each event of the samples. In some instances, the non-transitory computer readable storage medium includes algorithm for generating a compound population from cytometry data from two or more different samples where the raw data from each sample is retained as separate data files. In certain instances, the non-transitory computer readable storage medium includes algorithm for generating the compound population from cytometry data from two or more different samples where the raw data files from each sample are not concatenated to form a single combined data file.

In some embodiments, the non-transitory computer readable storage medium includes algorithm for applying a data gate to the compound population to generate a gated compound population. In some instances, the non-transitory computer readable storage medium includes algorithm for applying a hierarchy of data gates to the compound population. In some instances, the non-transitory computer readable storage medium includes algorithm for applying a hierarchy of data gates to the compound population to generate a hierarchy of gated compound populations. In some instances, the non-transitory computer readable storage medium includes algorithm for applying the data gate to one event of the compound population, where in certain instances applies the data gate to a plurality of events in the compound population. In certain instances, applying the data gate to a single event of the compound population provides for applying the data gate to every event in the compound population. In some embodiments, the non-transitory computer readable storage medium includes algorithm for defining one or more subpopulation of events of the compound population where application of a data gate is sufficient to apply the data gate all of the events of the subpopulation. In some embodiments, the non-transitory computer readable storage medium includes algorithm for applying an analysis algorithm to the gated compound population, such as instructions for applying a clustering algorithm or a compensation matrix to the gated compound population.

In certain embodiments, the non-transitory computer readable storage medium includes algorithm for desynchronizing a data gate for one or more samples of the gated compound population. In some instances, the non-transitory computer readable storage medium includes algorithm for desynchronizing a data gate by changing the geometry of a data gate applied to one or more samples of the gated compound population. In certain instances, the non-transitory computer readable storage medium includes algorithm for desynchronizing a data gate (e.g., changing gate geometry) for a plurality of samples, such as where data gates are desynchronized sequentially (i.e., one at a time) for each sample of the compound population.

In some embodiments, the non-transitory computer readable storage medium includes algorithm for generating a graphical user interface that includes a first pane configured that displays one or more ungated compound populations that includes cytometry data of one or more groups of samples, a second pane that displays one or more gated compound populations; and a third pane that displays data files for each of the samples used to generate the compound populations. In some instances, the non-transitory computer readable storage medium includes algorithm for generating a graphical user interface where the second pane displays a hierarchy of gated compound populations. In some instances, the second pane displays analysis algorithms applied to the events of the compound population that is selected in the first pane, such as clustering algorithms or compensation matrices applied to compound populations displayed in the first pane. In some embodiments, the hierarchy of gated compound populations are color-coded in the second pane. In some examples, each of the inherited data gates are labeled in the same color. In some instances, the non-transitory computer readable storage medium includes algorithm for generating a graphical user interface which visualizes the desynchronized data gates in the second pane. In some instances, each desynchronized data gate is visualized in the second pane by a distinct text font. In some embodiments, the non-transitory computer readable storage medium includes algorithm for displaying in the third pane of the graphical user interface data files for each sample having events within a gated compound population that is selected in the second pane.

In some embodiments, the non-transitory computer readable storage medium includes algorithm for applying an analysis algorithm that is displayed in the first pane to one or more of the gated compound populations displayed in the second pane. In certain instances, the non-transitory computer readable storage medium includes algorithm for applying an analysis algorithm to one or more gated compound populations by dragging the analysis algorithm displayed in the first pane onto the gated compound population displayed in the second pane. In other instances, the non-transitory computer readable storage medium includes algorithm for applying an analysis algorithm to one or more gated compound populations by selecting an analysis algorithm from a menu of analysis algorithms and applying the selected algorithm to the gated compound population displayed in the second pane. In certain instances, the non-transitory computer readable storage medium includes algorithm for displaying an icon in the second pane of the graphical user interface on the gated compound population in response to applying the analysis algorithm from the first pane. In some embodiments, the non-transitory computer readable storage medium includes algorithm for applying the analysis algorithm to the gated compound population in the second pane such that the analysis algorithm is applied to one or more sub-groups in the hierarchy of applied data gates. In some instances, applying the analysis algorithm to the gated compound population is sufficient to apply the analysis algorithm to all of the gated compound populations in the hierarchy of applied data gates.

In some embodiments, the non-transitory computer readable storage medium includes algorithm for applying an analysis algorithm displayed in the first pane to one or more of the data files for the samples displayed in the third pane. In certain instances, the non-transitory computer readable storage medium includes algorithm for applying the analysis algorithm by dragging an analysis algorithm displayed in the first pane onto a data file for a sample displayed in the third pane. In other instances, the non-transitory computer readable storage medium includes algorithm for applying an analysis algorithm to one or more of the data files for the samples displayed in the third pane by selecting an analysis algorithm from a menu of analysis algorithms and applying the selected algorithm to one or more of the data files for the samples displayed in the third pane. In some embodiments, the non-transitory computer readable storage medium includes algorithm for applying an analysis algorithm displayed in the second pane (e.g., tSNE, x-shift algorithm) to one or more of the data files for the samples displayed in the third pane. In certain instances, the non-transitory computer readable storage medium includes algorithm for applying the analysis algorithm by dragging an analysis algorithm displayed in the second pane onto a data file for a sample displayed in the third pane.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as those mentioned above, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Aspects of the present disclosure further include kits, where kits include one or more of the components of light detection systems described herein. In some embodiments, kits include a plurality of photodetectors and programming for the subject systems, such as in the form of a computer readable medium (e.g., flash drive, USB storage, compact disk, DVD, Blu-ray disk, etc.) or instructions for downloading the programming from an internet web protocol or cloud server. Kits may also include an optical adjustment component, such as lenses, mirrors, filters, fiber optics, wavelength separators, pinholes, slits, collimating protocols and combinations thereof.

Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems and computer systems find use in a variety of applications where it is desirable to optimize the analysis of flow cytometer data. The subject methods and systems also find use for particle analyzers having a plurality of photodetectors that are used to analyze and sort particle components in a sample in a fluid medium, such as a biological sample. The present disclosure finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment (e.g., concatenation of data) of sample analysis of flow cytometer data.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112(f) or 35 U.S.C. § 112(6) is not invoked.

What is claimed is:

1. A method for processing cytometry data, the method comprising with a processor:

generating a compound population of events comprising data accessors from cytometry data from two or more samples comprising particles;

applying a hierarchy of data gates to the compound population to generate a plurality of gated compound populations;

applying a comparative analysis algorithm to the one or more of the gated compound populations based on a controlled characteristic to generate an analysis data set comprising features extracted from the gated compound population; and displaying on a graphical user interface of a display a selectable depiction of the generated analysis data set.

2. The method according to claim 1, wherein the compound population is generated from cytometry data from two or more different samples.

3. The method according to claim 2, wherein the cytometry data of the compound population from the two or more different samples is retained in separate raw data files.

4. The method according to claim 3, wherein the raw data files comprising the cytometry data are not concatenated to form a single combined data file.

5. The method according to claim 1, wherein the data accessors are configured to access metadata for each event of the cytometry data from one or more samples.

6. The method according to claim 1, wherein the data accessors comprise source identity for each event of the cytometry data from the one or more samples.

7. The method according to claim 1, wherein applying a data gate to a single event of the compound population is sufficient to apply the data gate to a plurality of events of the compound population.

8. The method according to claim 7, wherein applying a data gate to the plurality of events of the compound population is sufficient to apply the data gate to all of the events of the compound population.

9. The method according to claim 1, wherein the method comprises desynchronizing a gate for one or more samples of the gated compound population.

10. The method according to claim 1, wherein desynchronizing a gate for one or more samples of the gated compound population comprises changing a gate geometry of the gate.

11. The method according to claim 1, wherein the compound population of events is displayed on a graphical user interface.

12. The method according to claim 11, wherein the graphical user interface comprises:

a first pane configured to display one or more ungated compound populations comprising cytometry data of one or more groups of samples;

a second pane configured to display one or more gated compound populations; and a third pane configured to display data files for each of the samples used to generate the compound populations.

13. The method according to claim 12, wherein the gated compound populations of the second pane are displayed as a hierarchy.

14. The method according to claim 12, wherein the second pane is configured to display analysis algorithms.

15. The method according to claim 12, wherein desynchronized data gates are visualized in the second pane.

16. The method according to claim 1, wherein the cytometry data comprises flow cytometry data from particles irradiated by a light source in a flow stream.

17. The method according to claim 1, wherein the cytometry data is represented in a flow cytometry standard (FCS) format.

18. The method according to claim 1, wherein the analysis algorithm is selected from the group consisting of a spectral unmixing algorithm, a clustering algorithm, a t-distributed stochastic neighbor embedding (tSNE) algorithm and an x-shift algorithm.

19. The method according to claim 1, wherein the depiction of the generated analysis data sets are color-coded icons on the graphical user interface.

* * * * *